(12) United States Patent
Hirano et al.

(10) Patent No.: US 9,154,257 B2
(45) Date of Patent: Oct. 6, 2015

(54) FREQUENCY ASSIGNMENT METHOD AND APPARATUS

(75) Inventors: Akira Hirano, Yokosuka (JP); Yoshiaki Sone, Yokosuka (JP); Akihiro Kadohata, Yokosuka (JP); Takafumi Tanaka, Yokosuka (JP); Shinji Matsuoka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 322 days.

(21) Appl. No.: 13/880,260

(22) PCT Filed: Oct. 24, 2011

(86) PCT No.: PCT/JP2011/074465
§ 371 (c)(1),
(2), (4) Date: Apr. 18, 2013

(87) PCT Pub. No.: WO2012/057095
PCT Pub. Date: May 3, 2012

(65) Prior Publication Data
US 2013/0216226 A1 Aug. 22, 2013

(30) Foreign Application Priority Data

Oct. 25, 2010 (JP) .................................. 2010-238862
Mar. 23, 2011 (JP) .................................. 2011-064759
Jul. 14, 2011 (JP) .................................. 2011-156119

(51) Int. Cl.
*H04J 14/00* (2006.01)
*H04J 14/02* (2006.01)
(Continued)

(52) U.S. Cl.
CPC ......... *H04J 14/0227* (2013.01); *H04J 14/0257* (2013.01); *H04J 14/0267* (2013.01); *H04L 45/62* (2013.01)

(58) Field of Classification Search
CPC . H04J 14/0227; H04J 14/0257; H04J 14/026; H04J 14/0267
See application file for complete search history.

(56) References Cited

U.S. PATENT DOCUMENTS 6,538,777 B1  3/2003  Barry et al.
2004/0190900 A1*  9/2004  Yagyu .............................. 398/57

FOREIGN PATENT DOCUMENTS

JP  2002 247009  8/2002
JP  2004 297230  10/2004
(Continued)

OTHER PUBLICATIONS

Simmons, J., "Optical Network Design and Planning," Optical Networks, Springer, Chapter 5, pp. 136 to 141, (2008).
(Continued)

*Primary Examiner* — Daniel Dobson
(74) *Attorney, Agent, or Firm* — Oblon, McClelland, Maier & Neustadt, L.L.P.

(57) ABSTRACT

A frequency assignment method for selecting a frequency width used on a route connecting between a start point and an end point when the start point and the end point of an optical signal are supplied in a photonic network including an optical node that includes an optical switch for switching the optical signal without electrically terminating the optical signal is disclosed. The frequency assignment method includes steps of: obtaining a correlation amount of use state of wavelength or frequency between adjacent links by referring to a route calculation result; determining a fixed frequency width or variable frequency width to be set for a communication route based on the correlation amount; and assigning the fixed frequency width or the variable frequency width on the route.

22 Claims, 23 Drawing Sheets

(51) Int. Cl.
    *H04L 12/721*    (2013.01)
    *H04B 10/00*     (2013.01)

(56) References Cited

FOREIGN PATENT DOCUMENTS

| JP | 2006 211385 | 8/2006 |
|----|-------------|--------|
| JP | 2007 288280 | 11/2007 |

OTHER PUBLICATIONS

International Search Report Issued Dec. 6, 2011 in PCT/JP11174465 Filed Oct. 24, 2011.

Extended European Search Report issued Nov. 18, 2013 in Patent Application No. 11836228.4.

Pin-Han Ho, et al., "A Novel Design of Optical Cross-connects with Multi-Granularity Provisioning Support for the Next-Generation Internet" New Frontiers in Telecommunications: 2003 IEEE International Conference on Communications, vol. 1, XP010642816, May 11, 2003, pp. 582-587.

Aleksandar Kolarov, et al., "A Study of Waveband Routing and Wavelength Assignment in Multi-Granular Hybrid Optical Networks" Communications, 2005, IEEE International Conference on Seoul, Korea, vol. 1, XP010827515, May 16, 2005, pp. 239-243.

Dragos Andrei, et al., "Provisioning of Deadline-Driven Requests With Flexible Transmission Rates in WDM Mesh Networks" IEEE/ACM Transactions on Networking, vol. 18, No. 2, XP011296859, Apr. 1, 2010, pp. 353-366.

\* cited by examiner

FIG.21

| PAIR OF LOGICAL CALCULATION | FIBERS FORMING PASSING FIBER GROUP H OF CANDIDATE ROUTE | FIBERS FORMING FIBER GROUP G ADJACENT TO PASSING FIBER OF CANDIDATE ROUTE |
|---|---|---|
| PAIR 1 | f25 | f18 |
| PAIR 2 | f25 | f19 |
| PAIR 3 | f25 | f24 |
| PAIR 4 | f25 | f31 |
| PAIR 5 | f25 | f32 |
| PAIR 6 | f26 | f20 |
| PAIR 7 | f26 | f33 |
| PAIR 8 | f27 | f21 |
| PAIR 9 | f27 | f28 |
| PAIR 10 | f27 | f28 |

FREQUENCY ASSIGNMENT METHOD AND APPARATUS

TECHNICAL FIELD

The present invention relates to a frequency assignment method and apparatus. More particularly, the present invention relates to a technique for selecting a route of an optical path connecting a start point and an end point of an optical signal and selecting a wavelength used on the route, in a photonic network formed by optical nodes each of which includes an optical switch that performs switching without electrically terminating an optical signal. More particularly, the present invention relates to a frequency assignment method and an apparatus that can establish a route and assigns a wavelength, and that can be applied even when frequency bandwidths are different, in a photonic network for realizing efficient use of wavelength in an optical path network including an optical path that is switched as light in optical nodes.

BACKGROUND ART

An optical path network that supports current backbone networks mainly includes optical communication apparatuses such as wavelength multiplexing transmission apparatuses, optical add/drop apparatuses and optical cross connect apparatuses, transmission routes such as optical fibers connecting the apparatuses, and paths such as wavelengths connecting between optical communication apparatuses by passing through transmission routes. Especially, research and development of a transparent type optical path network is attracting attention, in which the transparent type optical path network is for connecting between optical communication apparatuses of the optical path network from an end to the other end without regenerative relay processing for the optical signal. One of problems for the transparent type optical path network is to determine a route on the network and to determine a wavelength to be assigned on the determined route when receiving a traffic transfer request. These are generally referred to as Routing and Wavelength Assignment (RWA) problem.

A conventional RWA scheme in the transparent type optical path network is described. As shown in FIG. 1, when performing RWA, a route is determined first by routing processing in general. The shortest path algorithm is often used for determining the route. As shown in FIG. 2, as the shortest path algorithm, there are a fewest-hop method, a shortest distance method and the like. The fewest-hop method is a method for minimizing the number of hops between end points of the route, and the shortest distance method is a method for minimizing the physical distance. After determining the route by these methods, a wavelength is assigned by a first-fit method, a most-used method, or the like. In the first-fit method, in a case where there are a plurality of candidates of wavelengths that can be assigned when selecting a wavelength on a route, wavelengths, to which numbers are assigned, are assigned in order from lower number. As to the numbers assigned to wavelengths, wavelengths are numbered in order from the shortest wavelength. Also, wavelengths may be numbered in order from the longest wavelength. In the most-used method, in a case where there are a plurality of candidates of wavelengths when selecting a wavelength on a route, the number of wavelengths used in the whole network is counted for each wavelength, and the most used wavelength is used preferentially (refer to non-patent document 1, for example).

The above-mentioned RWA method is expected to realize economy and power saving of the optical path network by efficiently utilizing limited wavelength resources in the transparent type optical path network.

In addition, recently, an optical network (band variable optical network) for flexibly assigning optical frequency resources is being studied. In a conventional transparent type optical path network, frequency resources are assigned based on fixed frequency bandwidths for the optical path. On the other hand, in the above-mentioned optical network, the network is configured by band variable transponders and band variable cross-connects, in which frequency resources are managed by more segmentalized slots (grids), and frequency resources only as needed are assigned in bands and routes of the optical path, so as to utilize resources efficiently.

By the way, as to terms representing communication resources used in the following explanation, "wavelength" is mainly used in explanation on a path in which the frequency bandwidth is fixed, and "frequency" is mainly used in explanation on a path in which frequency bandwidth is variable.

RELATED ART DOCUMENT

[Non-Patent document 1] Jane M. Simmons, "Optical Network Design and Planning", Springer, pp. 136-141. 2008

SUMMARY OF THE INVENTION

Problem to be Solved by the Invention

However, in the past RWA method, there are following problems in the transparent type optical path network which is not band variable, and in the transparent type optical path network which is band variable (to be referred to as band variable optical network, hereinafter) respectively.

In the case of the transparent type optical path network which is not band variable, there is a problem in efficient use of wavelength resources. Especially, in the first-fit method which is one of conventional techniques of wavelength assignment, a usable wavelength candidate is searched so that a wavelength is simply assigned in order from one having a small wavelength number. According to this method, a new wavelength is assigned without considering use state of wavelengths that are used in other links. This situation is described with reference to FIGS. 3 and 4 by using examples.

For example, considering a ring network, the wavelength use state can be represented as shown in FIG. 3. In the figure, the vertical axis represents wavelengths, and adjacent links are arranged on the horizontal axis. It is assumed that wavelengths are assigned using the first fit method. In this case, a wavelength is assigned irrespective of whether the wavelength is unused or not in an adjacent link adjacent to an optical node that is an end point of the assigned wavelength. As shown in FIG. 4, in this example, after assignment, fragmented sections occur in these adjacent links in the assigned wavelength. This is called fragmentation. In this example, a network of a simple ring structure is assumed, and each column shown in FIG. 4 represents a link between adjacent nodes.

In this example, fragmentation occurs even when the most-used method is used. When wavelength use states are counted over adjacent links in each wavelength, the wavelength that is assigned the smallest number becomes the maximum number of counts. Thus, also in the most-used method, fragmentation occurs.

If such fragmentation occurs, only fragmented links remain for assigning a next wavelength, so that a relatively long route having several hops cannot be reserved. Thus, although utilization ratio is the same in the whole wavelength, demand of long route length cannot be accepted. That is, although there are resources, a new demand cannot be accepted. This is a large problem in efficient use of the network.

In the band variable optical network, in addition to the restriction in which common wavelength should be used in passing routes, which is considered in the conventional technique, it becomes necessary to reserve consecutive frequency regions in a fiber and to assign the frequency regions to an optical path when assigning a plurality of slots (grids) (consecutive spectrum restriction). This restriction is not assumed in the conventional transparent type optical path network in which fixed wavelength (in other words, frequency resources of fixed width) is assigned in operation. Thus, since this restriction is not considered in the conventional wavelength assignment algorithm, there occurs a case where frequency resources cannot be efficiently assigned. Therefore, when paths are accommodated in the band variable optical network by using the conventional method, there is a problem in that there occur many fragmentations of frequency use in which frequency resources are partially not used.

An object of the present invention is to provide a frequency assignment method and apparatus in a photonic network that can effectively suppress occurrence of fragmentation in the transparent type optical path network, and that can maximize utilization efficiency of wavelength (frequency) resources.

Means for Solving the Problem

According to an embodiment of the present invention, a frequency assignment method is provided for selecting a frequency width used on a route connecting between a start point and an end point when the start point and the end point of an optical signal are supplied in a photonic network including an optical node that includes an optical switch for switching the optical signal without electrically terminating the optical signal. The frequency assignment method includes a step in which:

in an apparatus comprising: a calculation result storage unit configured to store a calculation result of a route and a frequency; a router unit configured to perform route calculation and store the route calculation result in the calculation result storage unit; and an assignment unit configured to assign a frequency width of the network, the assignment unit refers to the route calculation result of the calculation result storage unit, obtains a correlation amount of use state of wavelength or frequency between adjacent links, determines a fixed frequency width or variable frequency width to be set for a communication route based on the correlation amount, and assigns the fixed frequency width or the variable frequency width on the route.

The frequency assignment method may includes:

an wavelength assigning step in which, when assigning an optical wavelength as the fixed frequency width, the assignment unit refers to the route calculation result of the calculation result storage unit so as to obtain, for each of optical node forming the route of the route calculation result, a correlation amount of use state of wavelength between a link to be added and an adjacent link adjacent via the optical node, and to add a wavelength in which use states are most consecutive between adjacent links.

Also, according to an embodiment of the present invention, a frequency assignment apparatus is provided for selecting a route and a frequency connecting between a start point and an end point of an optical signal in a photonic network including an optical node that includes an optical switch for switching the optical signal without electrically terminating the optical signal. The frequency assignment apparatus includes:

a route/frequency calculation result storage unit configured to store route and frequency calculation results;

a common free frequency information generation unit configured to extract fibers connected to each other, and perform logical calculation for logical information representing free frequency states of each of the extracted fibers so as to generate logical information on free frequency states common to fibers;

a free frequency state evaluation unit configured to provide an evaluation value for the free frequency states based on the generated free frequency information common to fibers, in consideration of consecutiveness of free frequencies in the free frequency states common to fibers; and a frequency and route determination unit configured to determine a frequency and passing fibers to be set as a communication route using the evaluation value calculated in the free frequency state evaluation unit as a criterion, and store the frequency and passing fibers in the route/frequency calculation result storage unit.

Effect of the Present Invention

According to an embodiment of the present invention, it becomes possible to effectively suppress occurrence of fragmentation in the transparent type optical path network, and to optimize utilization efficiency of wavelength (frequency) resources. Further, similar effects can be obtained even when the wavelength width is different for each path.

BRIEF DESCRIPTION OF THE DRAWINGS

FIG. 21 is a diagram showing an example of a combination for generating a logical bit sequence p in the seventh embodiment of the present invention;

EMBODIMENTS FOR CARRYING OUT THE INVENTION

In the following, embodiments of the present invention are described with reference to figures.

In the following, operation of a network management apparatus is described in which the network management apparatus is connected to a photonic network formed by optical nodes each of which includes an optical switch that performs switching without electronically terminating an optical signal.

First Embodiment

The first embodiment of the present invention is described with reference to FIGS. 5-9.

Figure 5:
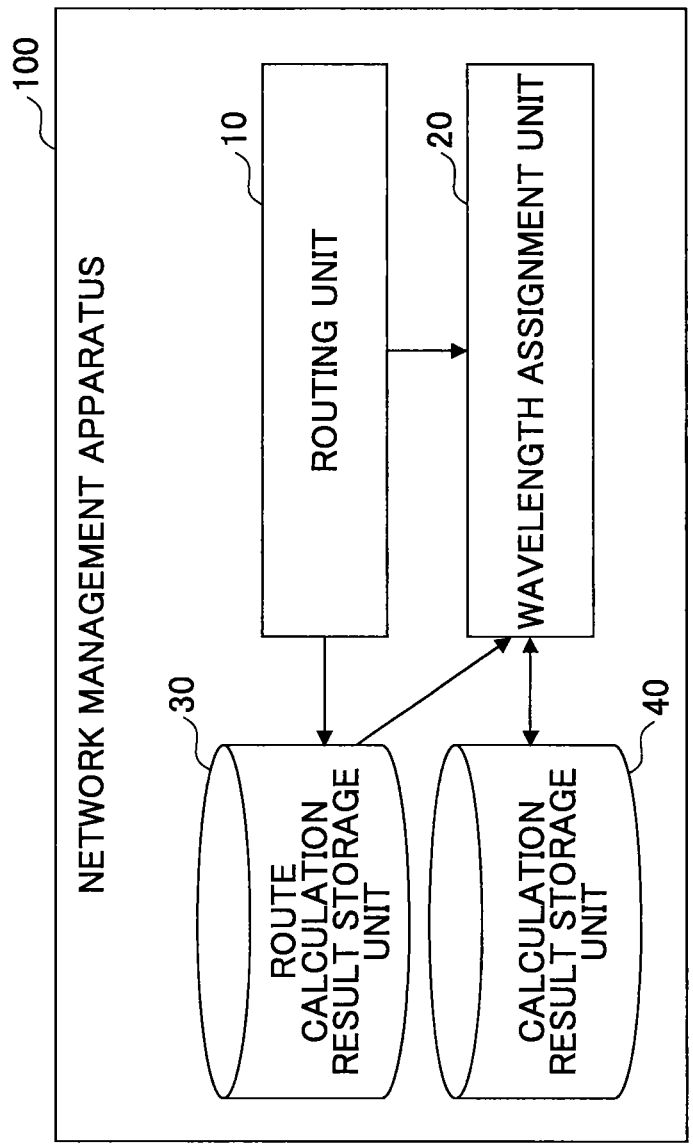
FIG. 5 is a block diagram of a network management apparatus of an RWA scheme used in a first embodiment of the present invention.

FIG. 5 shows a configuration of a network management apparatus of an RWA scheme used in the first embodiment.

The network management apparatus shown in the figured includes a routing unit 10, a wavelength assignment unit 20, a route calculation result storage unit 30, and a calculation result storage unit 40.

In the present embodiment, the routing unit 10 uses the shortest path algorithm (fewest-hop, shortest distance, and the like) for route calculation, that is, for routing. The wavelength assignment unit 20 uses a least-fragmentation (LF) method in wavelength assignment. The least-fragmentation (LF) method is a technique based on the present invention.

Each of the route calculation result storage unit 30 and the calculation result storage unit 40 is a storage medium such as a hard disk and a memory and the like. The route calculation result storage unit 30 stores a route calculation result of the routing unit 10, and the calculation result storage unit 40 stores intermediate and final calculation results of the wavelength assignment unit 20.

Figure 6:
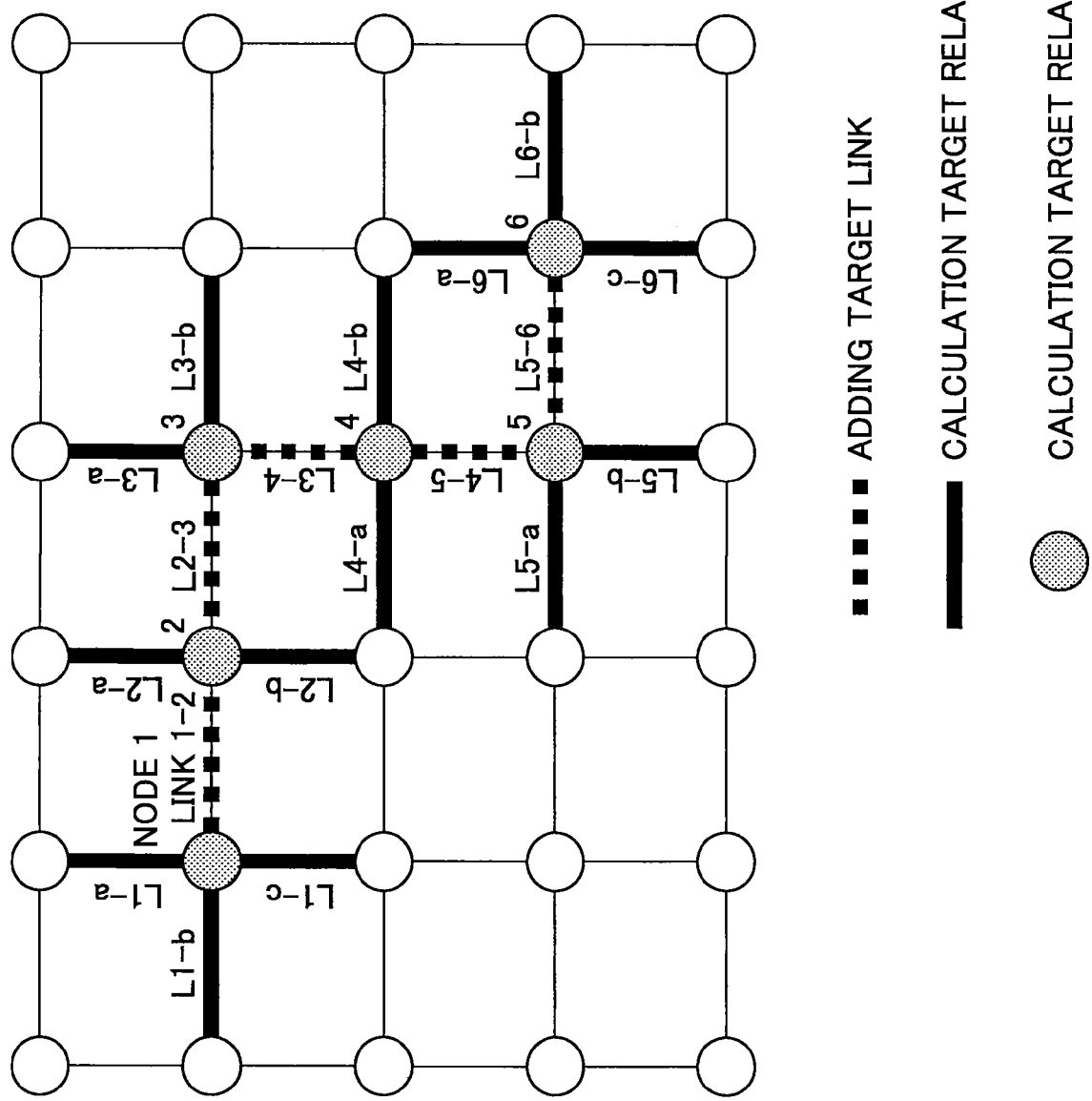
FIG. 6 is a physical model example of a network to which an embodiment of the present invention is applied.

FIG. 6 shows a physical model of a network to which the embodiment of the present invention is applied. A case is considered in which an optical path demand occurs for nodes 1-6. As a result of route calculation in the routing unit 10, it is assumed that a route shown by thick dot lines becomes the shortest route as an adding target link of FIG. 6 for the nodes 1-6. As the route calculation of the routing unit 10, the Dijkstra method can be used, for example.

Figure 7:
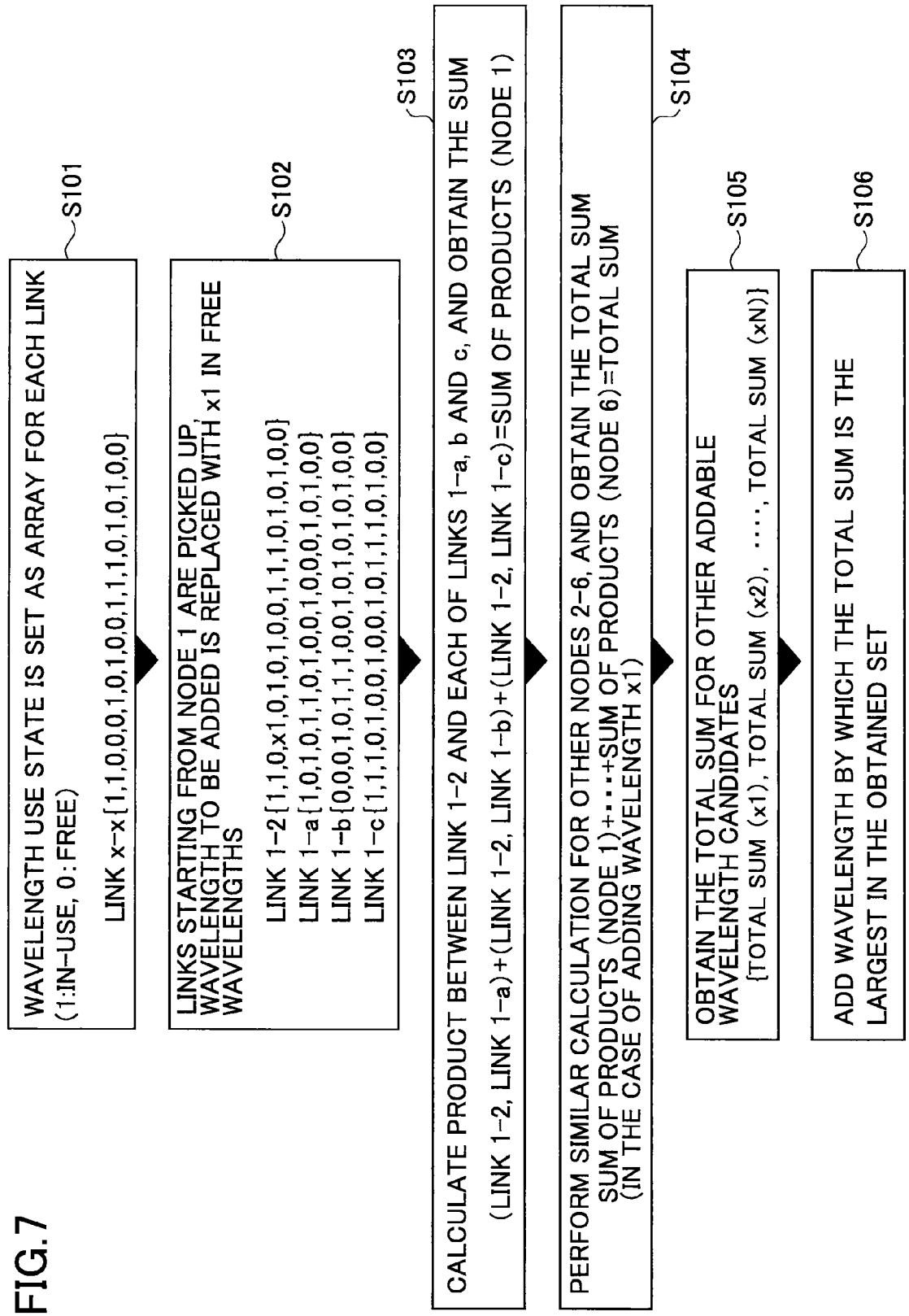
FIG. 7 is a flowchart showing a case where the Least-fragmentation method is used in the wavelength assignment unit in the first embodiment of the present invention.

Next, a wavelength to be assigned for the route is considered. FIG. 7 is a flowchart showing a process procedure performed by the wavelength assignment unit 20 using the least-fragmentation method in the first embodiment of the present invention.

First, it is assumed that one of wavelength candidates that can be added is extracted and used, in which the wavelength candidates are candidates of wavelengths that are unused in all links to which a wavelength is to be added.

Step 101) The wavelength assignment unit 20 represents use states of wavelengths of the link 1-2 that is the adding target link as an array as shown in an example of S101 of FIG. 7, and stores the array in a use state array area of the calculation result storage unit 40. In this example, a wavelength that is used is assigned "1", and a wavelength that is unused is assigned "0".

Figure 1:
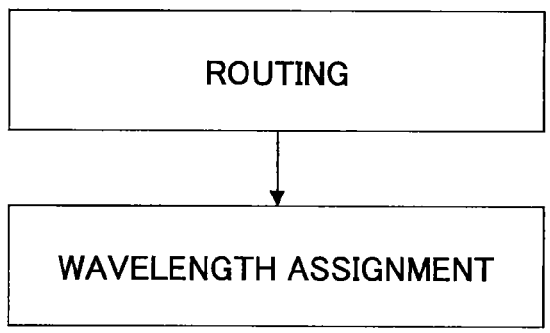
FIG. 1 is a diagram showing a basic scheme of RWA.
Figure 2:
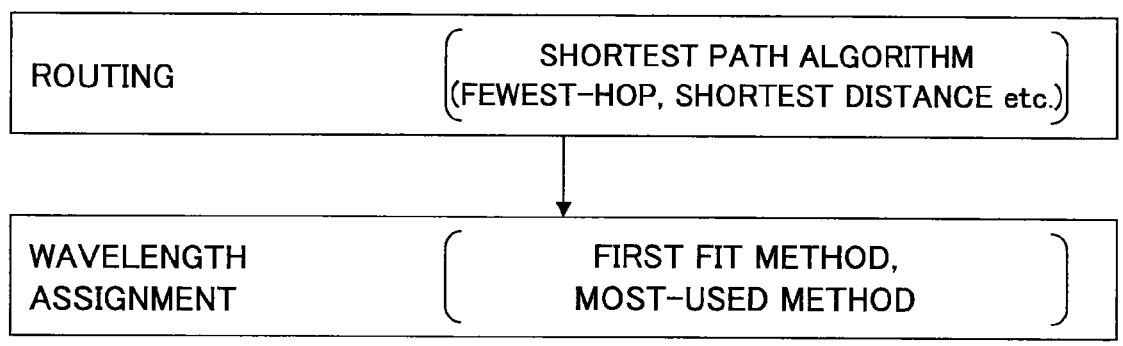
FIG. 2 is a diagram showing a conventional RWA scheme.
Figure 3:
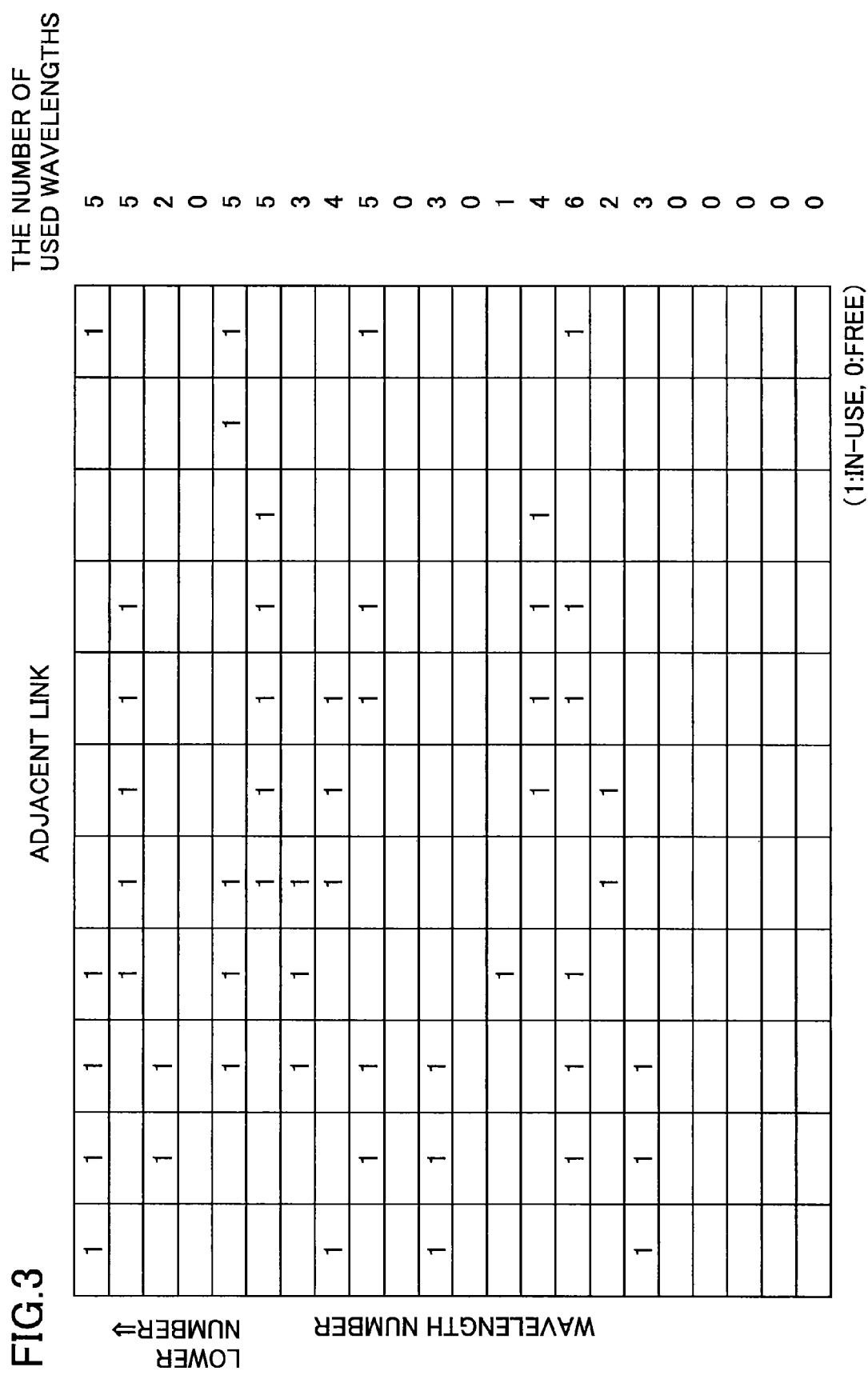
FIG. 3 shows an example of a conventional wavelength arrangement model.
Figure 4:
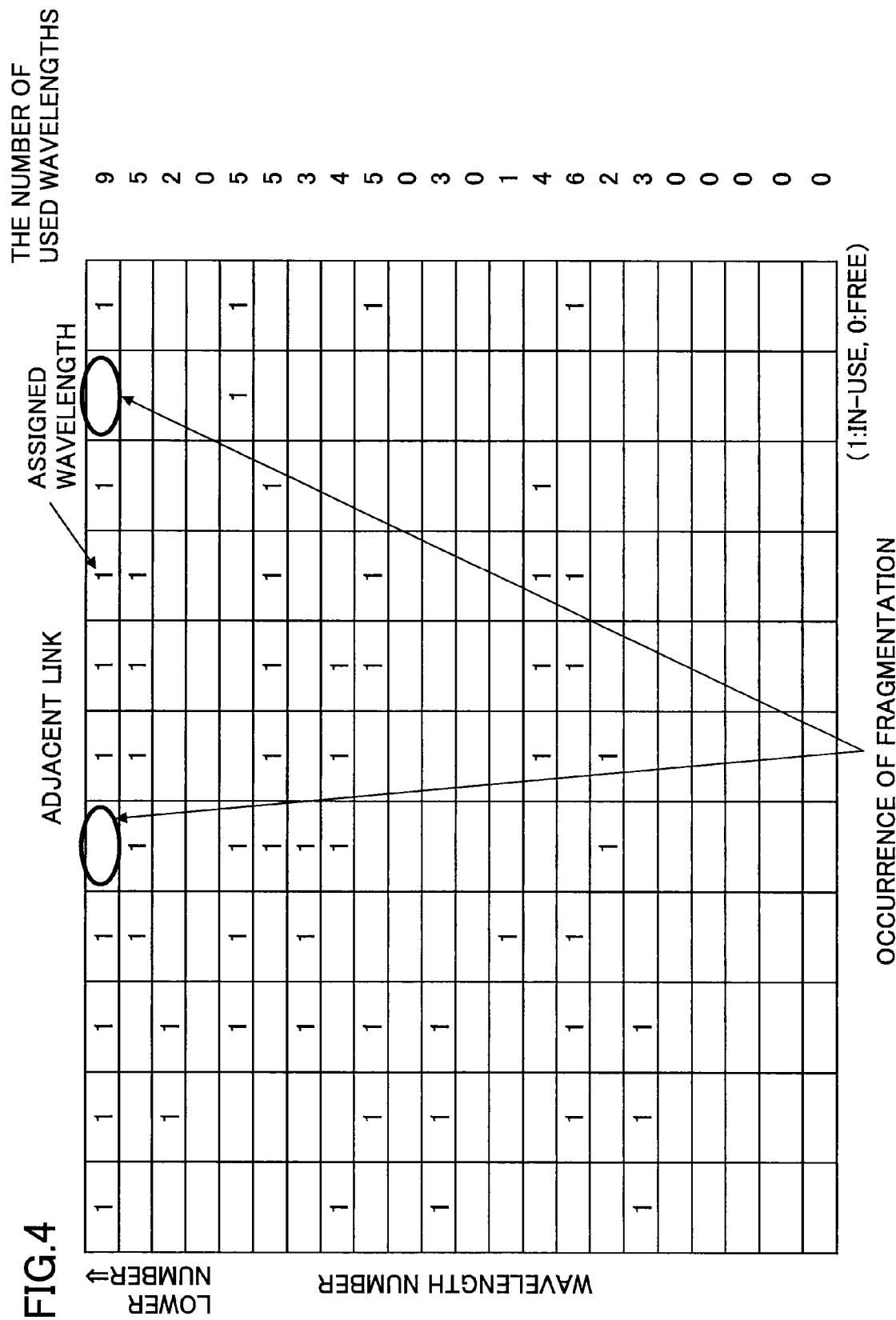
FIG. 4 shows an wavelength assignment example by a conventional example (first-fit or maximum-used)

Step 102) Next, the wavelength assignment unit 20 performs similar array representation for the links 1-$a$, 1-$b$ and 1-$c$ that are adjacent to the link 1-2 via the node 1. As shown in an example of S102 of FIG. 2, although the wavelength to be added is represented as x1, "1" is used as x1 in the following calculation.

Step 103) Next, as shown in the example of the step 103, a product is obtained for each element in the array between the link 1-2 and each of the adjacent links, and a sum of products for the whole wavelengths are calculated, and the sum is stored in the calculation result storage unit 40. The "sum of products" shown in FIG. 7 is the result of the sum calculation, and is represented as the total number of bits in which the value of logical AND of array elements between the links becomes True. For example, in the case of the product of link 1-2 and link 1-$a$, the first elements in the arrays are 1 and 1 respectively. Thus, the product becomes 1. Similarly, a product is obtained for the other links (links 1-$b$, 1-$c$), and the products are added over the whole wavelengths, and the total sum is obtained so as to store it in the calculation result storage unit 40.

Step 104) Further, the calculation for obtaining the total sum is similarly performed for other nodes on the route, that is, for nodes 2-6. In node 2, since links to be added are the link 1-2 and the link 2-3, the product is obtained for each element in arrays between the link 1-2 and each of links (links 2-$a$, 2-$b$, 2-3) that are adjacent to the link 1-2 via the node 2, and between the link 2-3 and each of links (links 2-$a$, 2-$b$, 1-2) that are adjacent to the link 2-3 via the node 2, and the sum of the products is calculated, and the sum is added over the whole wavelengths. Then, finally, the total sums obtained for each node are added for all of the nodes, and the value is stored in the calculation result storage unit 40.

Step 105) The above-mentioned operation is performed for every possible wavelength candidate, and the obtained values are stored in the calculation result storage unit 40.

Step 106) The result obtained by step 105 is read from the calculation result storage unit 40, and a wavelength candidate in which the sum of all nodes is the largest is adopted as an adding wavelength. The value of the sum is an example of a correlation amount of use states of wavelengths or frequencies between adjacent links. Also, the case where the sum of all nodes becomes the largest indicates that consecutiveness of use states of wavelengths between adjacent links is the highest.

Next, extended examples of the above-mentioned operation are described as follows.

Figure 8:
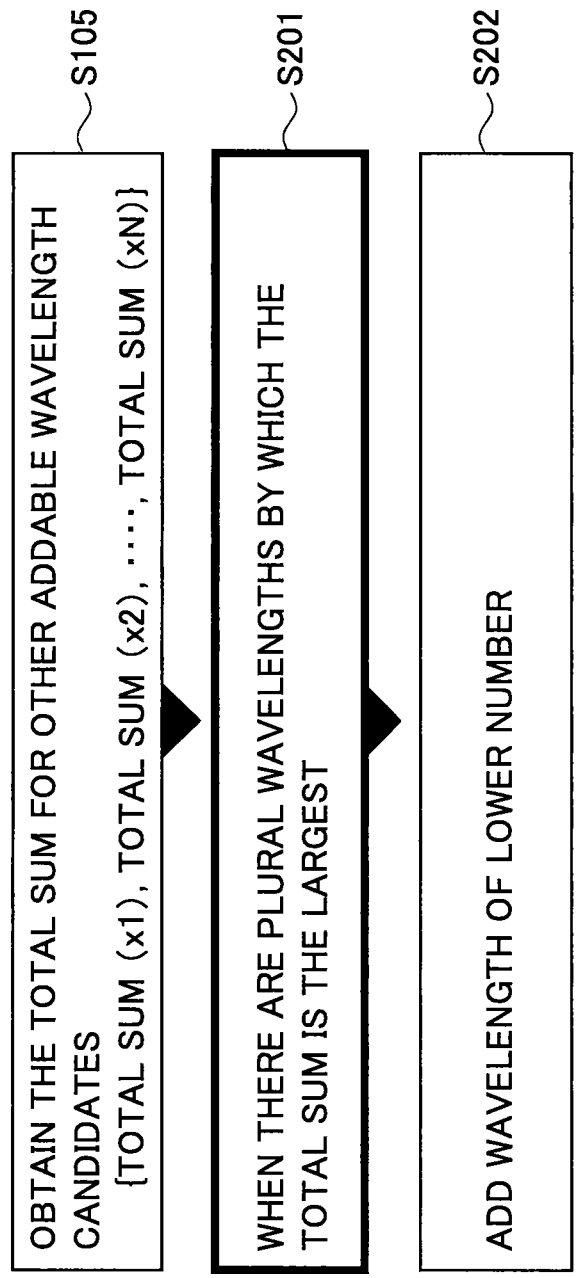
FIG. 8 is a flowchart (1) of operation of an extended least-fragmentation method in the first embodiment of the present invention.

FIG. 8 is a flowchart (1) of operation of the extended least-fragmentation method in the first embodiment of the present invention.

In the figure, steps after step 105 of FIG. 7 are shown. Steps 101-104 are similar to those of FIG. 7, and the description is not given.

When the result obtained in step 105 is read from the calculation result storage unit 40, if there are plural wavelengths of the largest total sum (step 201), a wavelength of a lower number is added to the route (step 202).

Figure 9:
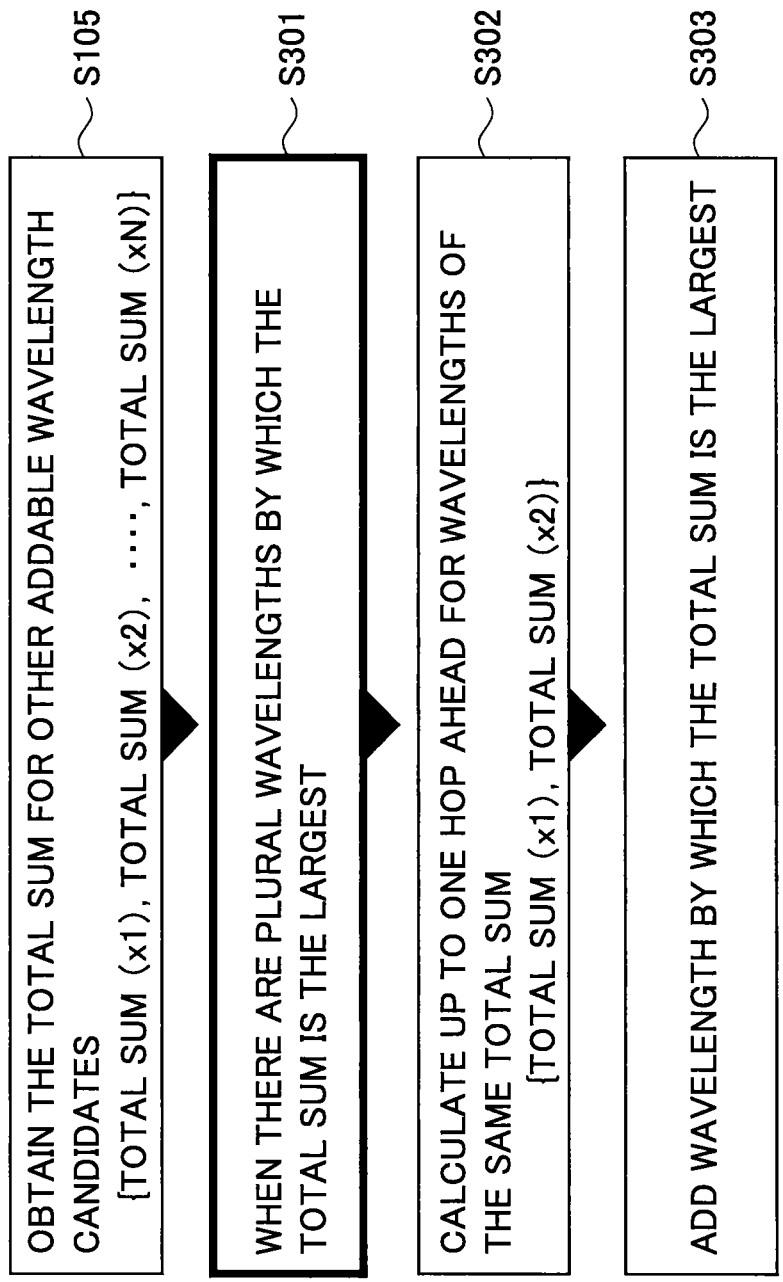
FIG. 9 is a flowchart (2) of operation of an extended least-fragmentation method in the first embodiment of the present invention.

FIG. 9 is a flowchart (2) of operation of the extended least-fragmentation method in the first embodiment of the present invention.

In the figure, steps after step 105 of FIG. 7 are shown. Steps 101-104 are similar to those of FIG. 7, and the description is not given.

When the result obtained in step 105 is read from the calculation result storage unit 40, if there are plural wavelengths of the largest total sum (step 301), calculation is performed 1 hop ahead for each of wavelengths in which the total sum is the same (step 302) so as to add a wavelength of the largest total sum (step 303). That is, the adjacent link for calculation of sum of products is extended to a link that is adjacent to an optical node, that is one hop ahead, connected to a link adjacent to an optical node that forms the route.

In the present embodiment, the lower number is selected according to the first fit method. Instead of that, a higher number may be selected, and also, a number may be selected according to a predetermined order such as the most used order based on the Most Used method, a random order and the like, which also apply to following embodiments similarly.

As mentioned above, in the present embodiment, a frequency assignment method is provided for selecting a frequency width used on a route connecting between a start point and an end point when the start point and the end point of an optical signal are supplied in a photonic network including an optical node that includes an optical switch for switching the optical signal without electrically terminating the optical signal. In the frequency assignment method, in an apparatus comprising: a calculation result storage unit configured to store a calculation result of a route and a frequency; a router unit configured to perform route calculation and store the route calculation result in the calculation result storage unit; and an assignment unit configured to assign a frequency width of the network, the assignment unit refers to the route calculation result of the calculation result storage unit, obtains a correlation amount of use state of wavelength or frequency between adjacent links, determines a fixed frequency width or variable frequency width to be set for a communication route based on the correlation amount, and assigns the fixed frequency width or the variable frequency width on the route.

More specifically, the frequency assignment method includes: an wavelength assigning step in which, when assigning an optical wavelength as the fixed frequency width, the assignment unit refers to the route calculation result of the calculation result storage unit so as to obtain, for each of optical node forming the route of the route calculation result, a correlation amount of use state of wavelength between a link to be added and an adjacent link adjacent via the optical node, and to add a wavelength in which use states are most consecutive between adjacent links.

The wavelength assignment step may include: when there are two or more wavelengths of the same correlation amount, extending a link that is a target for correlation to a link adjacent via an optical node, that is one-hop ahead, connected by a link adjacent via the optical node forming the route. Also, the wavelength assignment step may include: when there are two or more wavelengths of the same correlation amount, selecting an optical wavelength of a lower number in optical wavelengths that are arbitrarily numbered. In addition, the wavelength assignment step may include: when there are two or more wavelengths of the same correlation amount, selecting an optical wavelength of a lower number in optical wavelengths that are numbered in order from a shortest optical wavelength or from a longest optical wavelength.

Also, the wavelength assignment step includes: generating, on a storage unit, an array indicating use states of wavelengths for each of links forming the route; generating, on the storage unit, a similar array also for an adjacent link that is adjacent to the link via the optical node forming the route; calculating a correlation amount between the link and the adjacent link for each of optical nodes forming the route; and adding a wavelength by which the total sum of the obtained correlation amounts becomes the largest. By the way, the total sum of correlation amounts is a total sum of True bits of a new bit sequence that is obtained by performing logical calculation on logical bit sequences representing wavelength states or spectrum use states, which is similar for other embodiments.

In the wavelength assignment step, as the array indicating use states of wavelengths, a positive real number is used when the wavelength is used, and zero is used when the wavelength is unused. Further, in the wavelength assignment step, when the correlation amount for the link adjacent via the optical node, a product of elements of the same wavelength in the array is calculated, and the total sum of the products for every wavelength is used.

Second Embodiment

Figure 10:
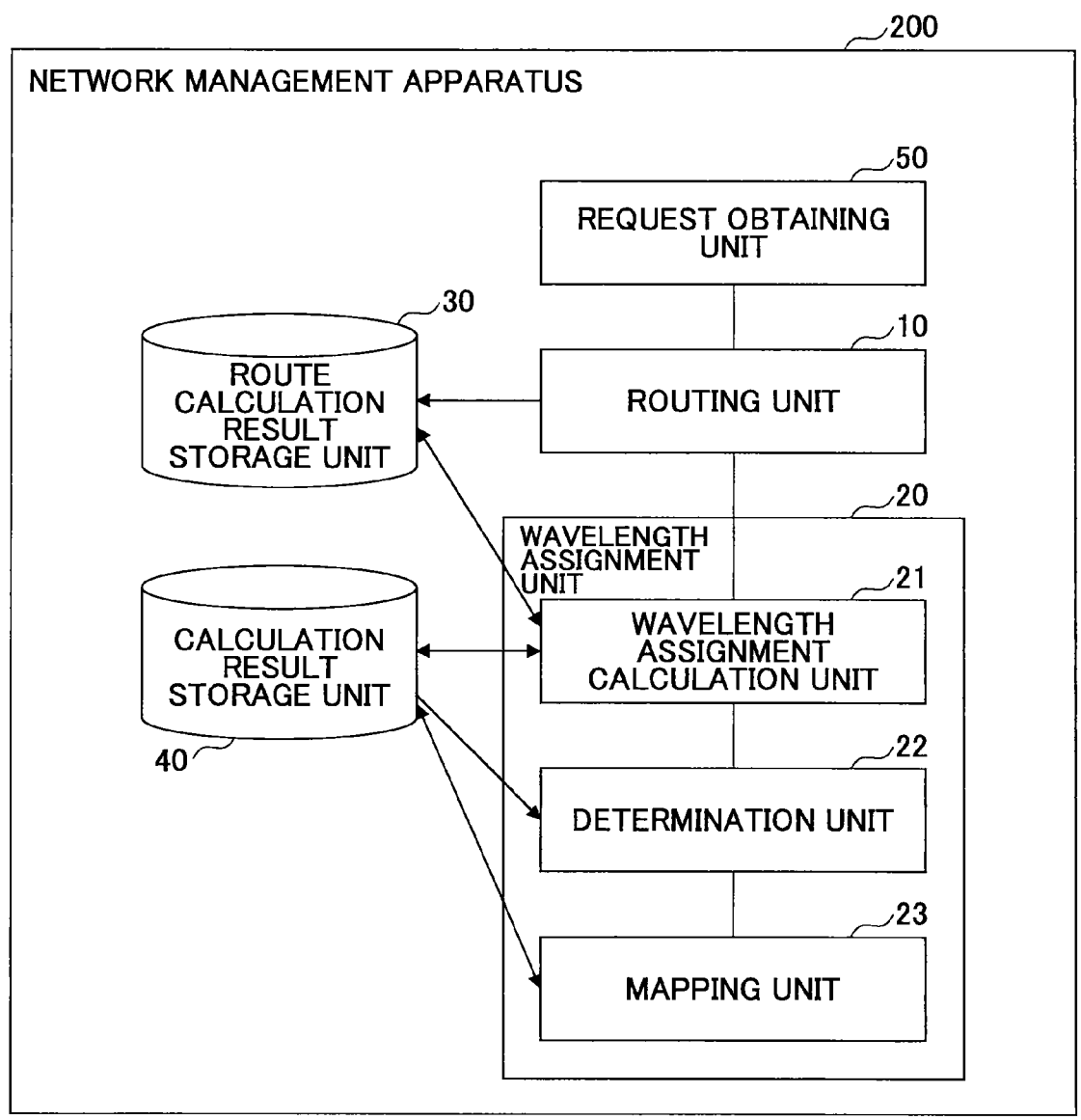
FIG. 10 is a block diagram of a network management apparatus in a second embodiment of the present invention.

FIG. 10 shows a configuration of a network management apparatus in a second embodiment of the present invention.

The same reference symbols are assigned to structural elements the same as those shown in FIG. 5, and the description of them is not given.

In the network management apparatus 200 shown in FIG. 10, a request obtaining unit 50 for obtaining an electrical path establishment request is added to the configuration shown in FIG. 5, and the wavelength assignment unit 20 includes a wavelength assignment calculation unit 21, a determination unit 22, and a mapping unit 23. The operation of the wavelength assignment calculation unit 21 is the same as the operation of the wavelength assignment unit 20 in the first embodiment.

Figure 11:
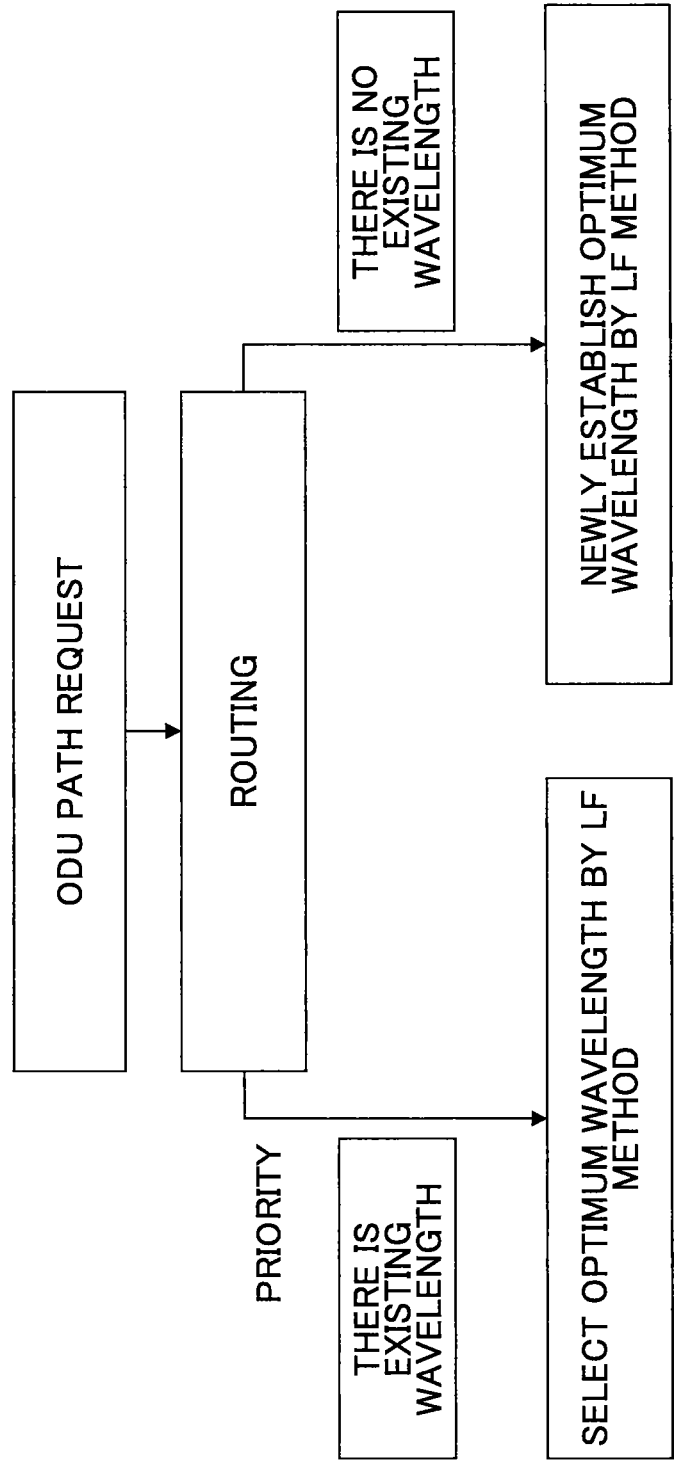
FIG. 11 is a diagram showing ODU accommodation by RWA in the second embodiment of the present invention.

Operation of the second embodiment of the present invention is described with reference to FIG. 11.

Operation of the routing unit 10 and the wavelength assignment calculation unit 21 conforms to the first embodiment.

In the present embodiment, first, the routing unit 10 performs route calculation based on an electrical path establishment request (ODU path request) obtained by the request obtaining unit 50. When the wavelength assignment unit 20 selects a wavelength to be assigned, the determination unit 22 determines whether there is an existing wavelength. Based on the determination result, the mapping unit 23 maps the electrical path to an already-set wavelength on a priority basis.

When there is an already-set wavelength, the mapping unit 23 selects an optimum wavelength by the LF method, and performs mapping to the wavelength. When there is not the already-set wavelength, the mapping unit 23 newly set an optimum wavelength by the LF method and performs mapping. In this example, the LF (Least-Fragmentation) method is a method for evaluating fragmentation status on the route for the wavelength to be selected or newly established, and selecting or newly establishing the wavelength that causes fragmentation least likely. The evaluation method is to quantify correlation of adjacent links (evaluation function example: sum of products, LEF and the like).

That is, in the present embodiment, the frequency assignment method further includes a request receiving step of receiving an electrical path establishment request, and the wavelength assignment step includes a mapping step in which, when performing route search based on the electrical path establishment request, if an existing wavelength exists, a route having the existing wavelength is selected preferentially, and the electrical path is mapped. In the mapping step, if the existing wavelength exists, an optical wavelength by which the correlation amount becomes the largest is selected from the existing wavelength. The correlation amount is obtained by extracting data of existing wavelength portion of the link forming the route and the adjacent link, and performing logical calculation for each existing wavelength portion.

Third Embodiment

The configuration of the network management apparatus in the present embodiment conforms to FIG. 10 in the previously described second embodiment.

Operation of the routing unit 10 and the wavelength assignment calculation unit 21 conforms to the first embodiment.

In the present embodiment, based on an electrical path establishment request obtained by the request obtaining unit 50, the routing unit 10 performs route calculation. When the wavelength assignment unit 20 selects a wavelength to be assigned, if the determination unit 22 determines that there is no wavelength already established as a wavelength derived by the wavelength assignment calculation unit 21, the mapping unit 23 adds a wavelength derived based on the first embodiment, and maps an electrical path to the wavelength.

That is, in the present embodiment, when performing route search based on the electrical path establishment request, if no existing wavelength exists, an optical wavelength by which the correlation amount described in the first embodiment becomes the largest is newly established, and the electrical path is mapped.

Fourth Embodiment

Figure 12:
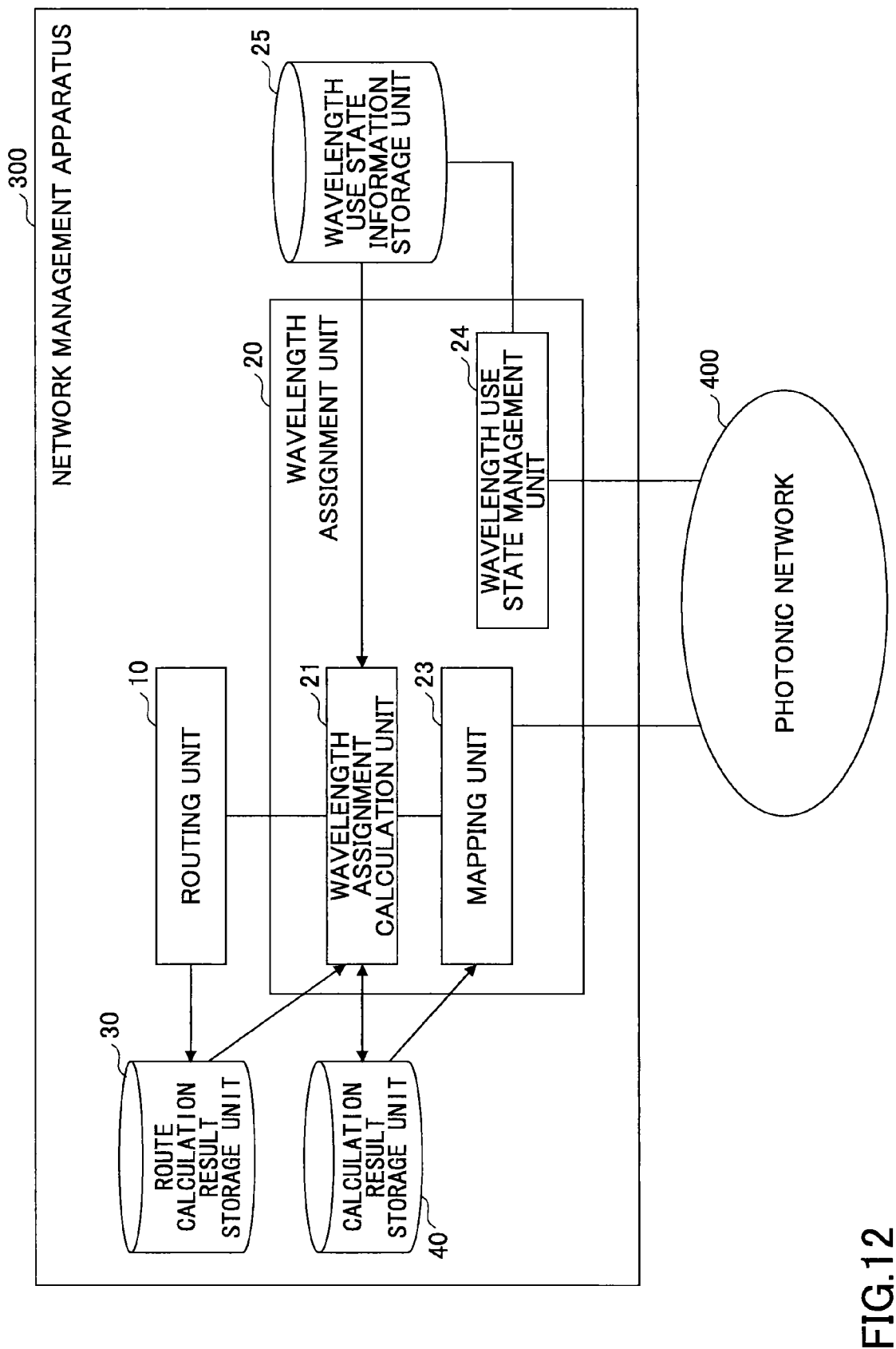
FIG. 12 is a block diagram of a network management apparatus in a fourth embodiment of the present invention.

The network management apparatus in the present embodiment is connected to a photonic network 400 as shown in FIG. 12, and the wavelength assignment unit 20 is provided with a wavelength use state management unit 24 for managing the wavelength use state of the photonic network 400 and a wavelength use state information storage unit 25 for storing the wavelength use state.

Operation of the routing unit 10 and the wavelength assignment calculation unit 21 of the present embodiment conforms to the first embodiment.

In the present embodiment, for each of optical nodes forming the route derived by the routing unit 10, the wavelength use state management unit 24 calculates correlation of use states between the link to be added and each adjacent link adjacent via the optical node, and stores the correlation in the wavelength use state information storage unit 25. The mapping unit 23 refers to the wavelength use state information storage unit 25, considers the correlation of use states of wavelengths, and adds a wavelength that is most consecutively used between adjacent links.

Fifth Embodiment

Figure 13:
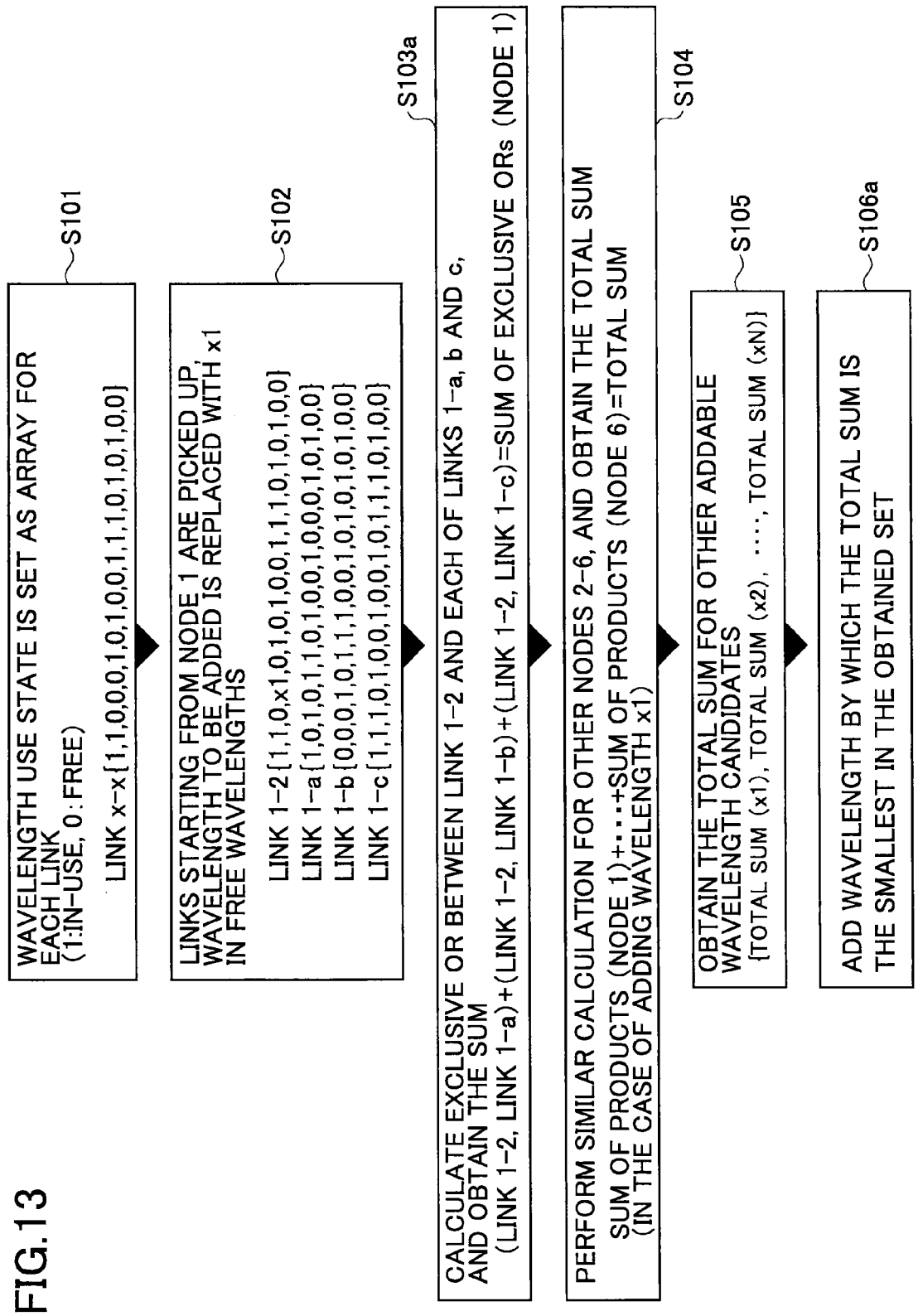
FIG. 13 is a flowchart of a fifth embodiment of the present invention in a case where a method (exclusive OR) different from FIG. 3 is used.
Figure 14:
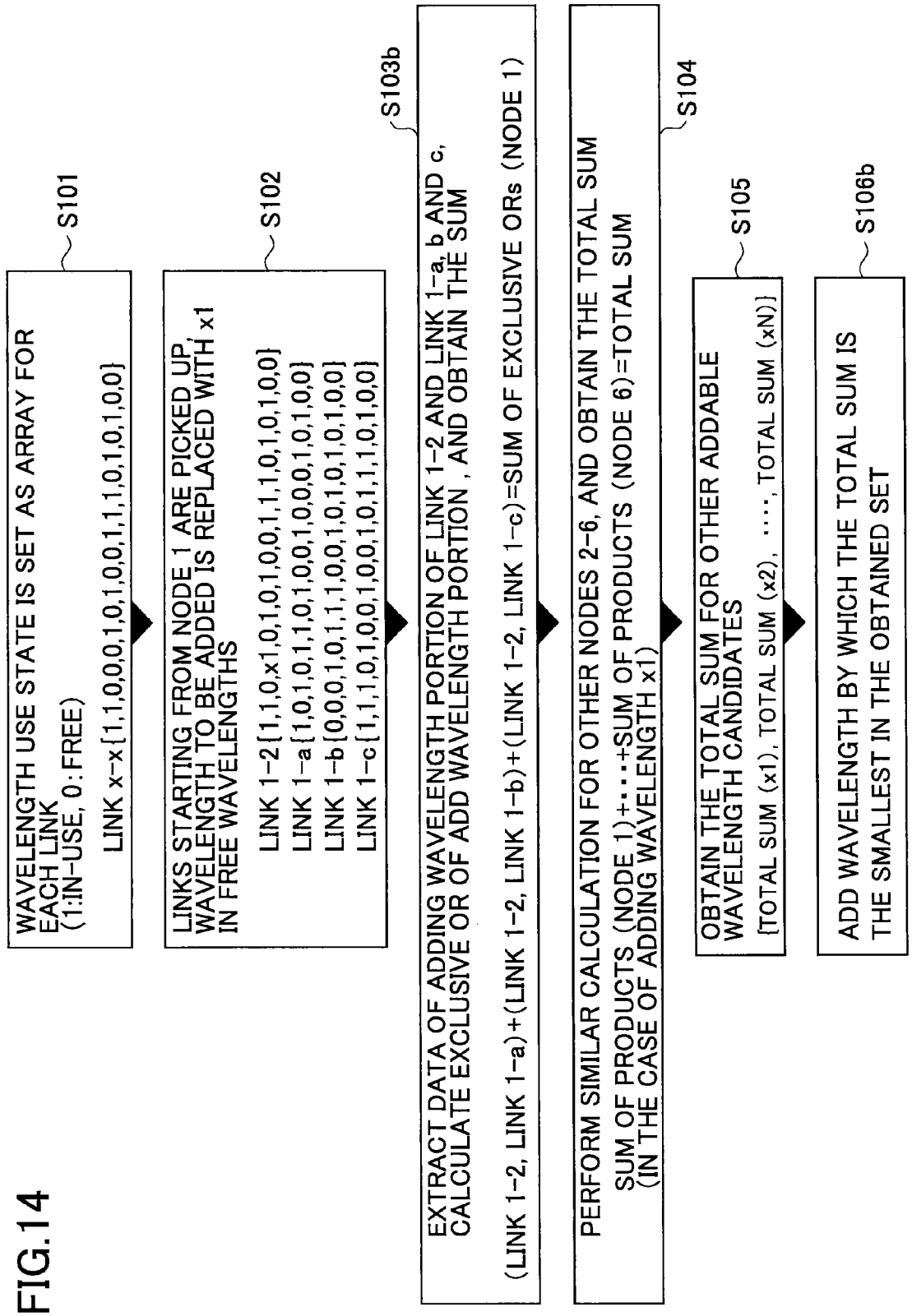
FIG. 14 is a flowchart of the fifth embodiment of the present invention in a case where a method (exclusive OR of adding wavelength portion) different from FIG. 7 is used.
Figure 15:
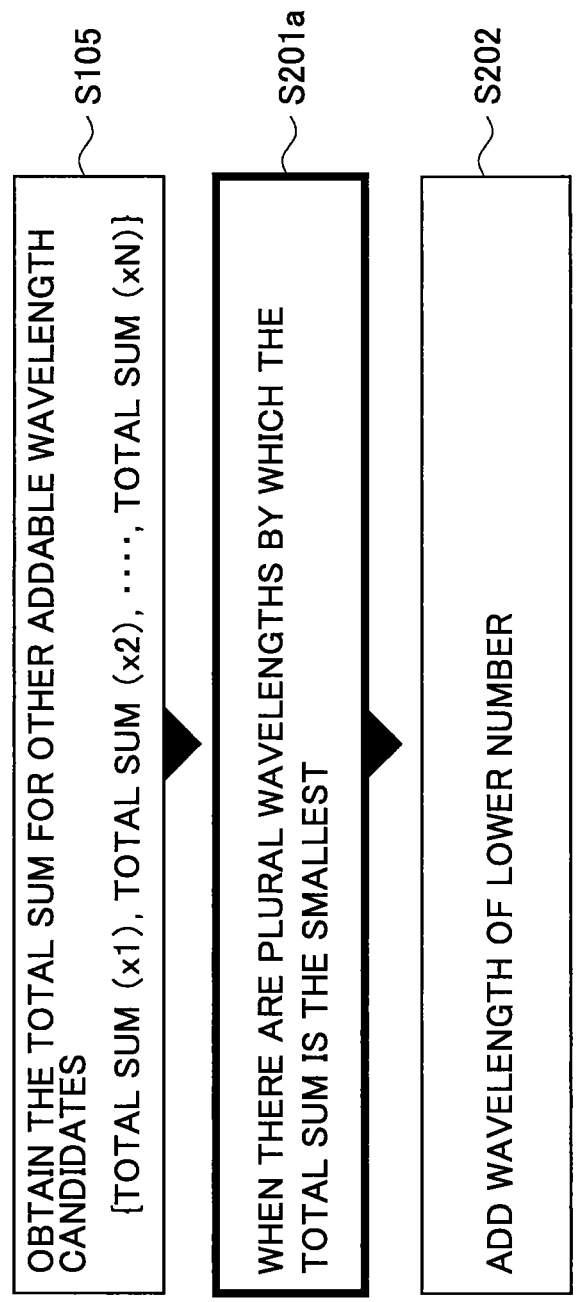
FIG. 15 is a flowchart of the fifth embodiment of the present invention in a case where a method (a plurality of total sum smallest wavelengths) different from FIG. 8 is used.

In the present embodiment, the procedure of the Least-fragmentation method of FIG. 7 in the before-described embodiment is replaced with the procedure shown in FIG. 13 or FIG. 14, and also, the procedure of the extended Least-fragmentation method of FIG. 8 is replaced with a procedure shown in FIG. 15. The sum of exclusive OR shown in FIGS. 13 and 14 represents the number of total bits in which the result of exclusive OR becomes True(1). Also, data of the adding wavelength portion extracted in FIG. 14 and the like is an element corresponding to a wavelength that is examined to be added in the array of wavelength use states. The exclusive OR of the adding wavelength portion is exclusive OR of an array formed only by the element corresponding to the wavelength that is examined to be added in the array of wavelength use states of each link.

The method shown in FIGS. 7 and 8 is a method for maximizing a pattern having high correlation. On the other hand, the present embodiment is a method for minimizing a pattern having low correlation.

FIG. 13 is a flowchart in a case where a method (exclusive OR) different from FIG. 7 is used in the fifth embodiment of the present invention. In the following, only processing different from FIG. 7 is described.

The wavelength assignment unit 20 obtains exclusive OR, for each wavelength use state, between wavelength use states of the adjacent link and wavelength use states of the link which is a candidate of establishment of a new path (step 103a). The wavelength assignment unit 20 selects an addable wavelength candidate in which the total sum of values obtained as a calculation result of the exclusive OR for all wavelengths and for all calculation target links becomes the smallest, and the wavelength assignment unit 20 determines the selected candidate to be an adding wavelength (step 106a).

FIG. 14 is a flowchart in a case where a method (exclusive OR of adding wavelength portion) different from FIG. 7 is used in the fifth embodiment of the present invention. In the following, only processing different from FIG. 7 are described.

In the case of FIG. 14, the wavelength assignment unit 20 extracts the adding wavelength portion of the link 1-2 and links 1-a, 1-b and 1-c, and calculates exclusive OR only for the adding wavelength portion (step 103b), in which the processing is not performed for portions other than the adding portion. In other processing, similar to FIG. 13, a wavelength in which the total sum becomes the smallest is selected and the selected wavelength is determined to be the adding wavelength (step 106b).

Accordingly, calculation speed can be increased.

FIG. 15 is a flowchart in a case where a method (a plurality of total sum smallest wavelengths) different from FIG. 8 is used in the fifth embodiment of the present invention.

In FIG. 8, when there are a plurality of wavelengths in which the total sum is the largest (step 201), a lower number of wavelength is added (step 202). On the other hand, in the case of FIG. 15, when there are a plurality of wavelengths in which the total sum is the smallest (step 201a), a lower number of wavelength is added (step 202).

In the case where the method shown in FIG. 13 or FIGS. 14 and 15 is used, and also, in the case where FIGS. 7 and 8 are used at the same time together with the method, an effect can be obtained for restricting occurrence of fragmented sections of assigned wavelength sections to be minimum like the case shown in the first-fourth embodiments.

That is, in the present embodiment, the wavelength assignment step includes: generating, on a storage unit, an array indicating use states of wavelengths for each of links forming the route; generating, on a storage unit, a similar array also for an adjacent link that is adjacent to the link via the optical node forming the route; calculating a correlation amount by exclusive OR between the link and the adjacent link for each of optical nodes forming the route; and adding a wavelength by which the total sum of the obtained correlation amounts becomes the smallest.

In another example, the wavelength assignment step includes: generating, on a storage unit, an array indicating use states of wavelengths for each of links forming the route; generating, on a storage unit, a similar array also for an adjacent link that is adjacent to the link via the optical node forming the route; extracting data of adding wavelength portion between the link and the adjacent link, calculating a correlation amount by exclusive OR for the adding wavelength portion for each of optical nodes forming the route; and adding a wavelength by which the total sum of the obtained correlation amounts becomes the smallest.

When there are two or more wavelengths by which the total sum of the correlation amounts becomes the smallest, a wavelength of a lower number is selected from among wavelengths that are arbitrarily numbered.

Sixth Embodiment

Figure 16:
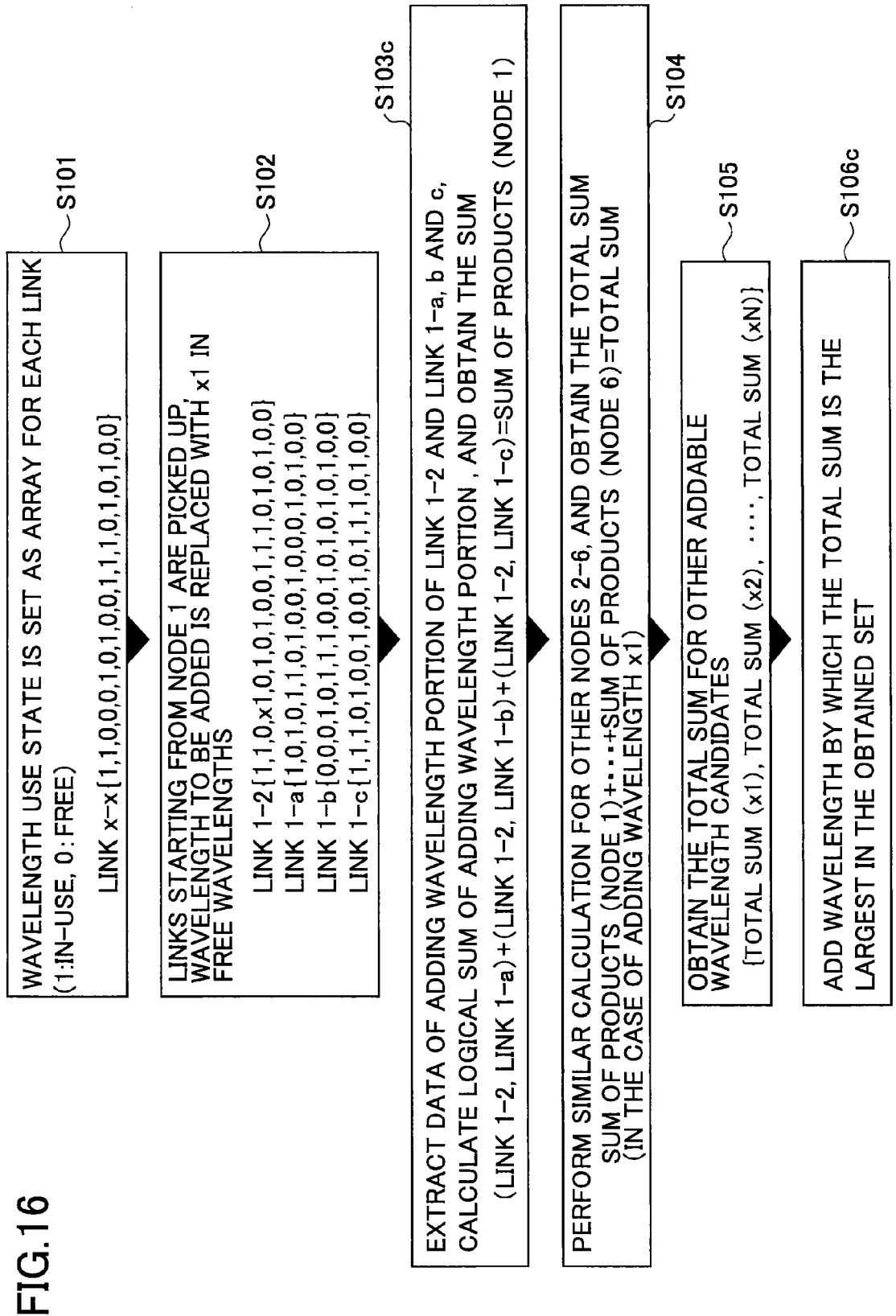
FIG. 16 is a flowchart of a sixth embodiment of the present invention in a case where a method (logical sum of adding wavelength portion) different from FIG. 7 is used.

The procedure of the first embodiment and the procedure similar to the first embodiment in the second-fourth embodiments can be carried out by replacing the Least-fragmentation method shown in FIG. 7 with a method shown in FIG. 16.

FIG. 16 is a flowchart in a case where a method (logical OR of adding wavelength portion) different from FIG. 7 is used in the sixth embodiment of the present invention.

The processing shown in FIG. 16 is a method in which, in the method of FIG. 7, the wavelength assignment unit 20 calculates logical OR only for the adding wavelength portion. More specifically, the wavelength assignment unit 20 extracts data of the adding wavelength portion of link 1-2 and links 1-1, 1-$b$ and 1-$c$, calculates logical OR for the adding wavelength portion, and obtains the sum (step 103$c$).

That is, in the present embodiment, the wavelength assignment step includes: generating, on a storage unit, an array indicating use states of wavelengths for each of links forming the route; generating, on a storage unit, a similar array also for an adjacent link that is adjacent to the link via the optical node forming the route; extracting data of adding wavelength portion between the link and the adjacent link, calculating a correlation amount by logical OR for the adding wavelength portion for each of optical nodes forming the route; and adding a wavelength by which the total sum of the obtained correlation amounts becomes the largest.

Accordingly, calculation speed can be increased. Also, in this case, an effect can be obtained for minimizing occurrence of fragmented sections of assigned wavelength sections like the case shown in the first-fourth embodiments.

Figure 17:
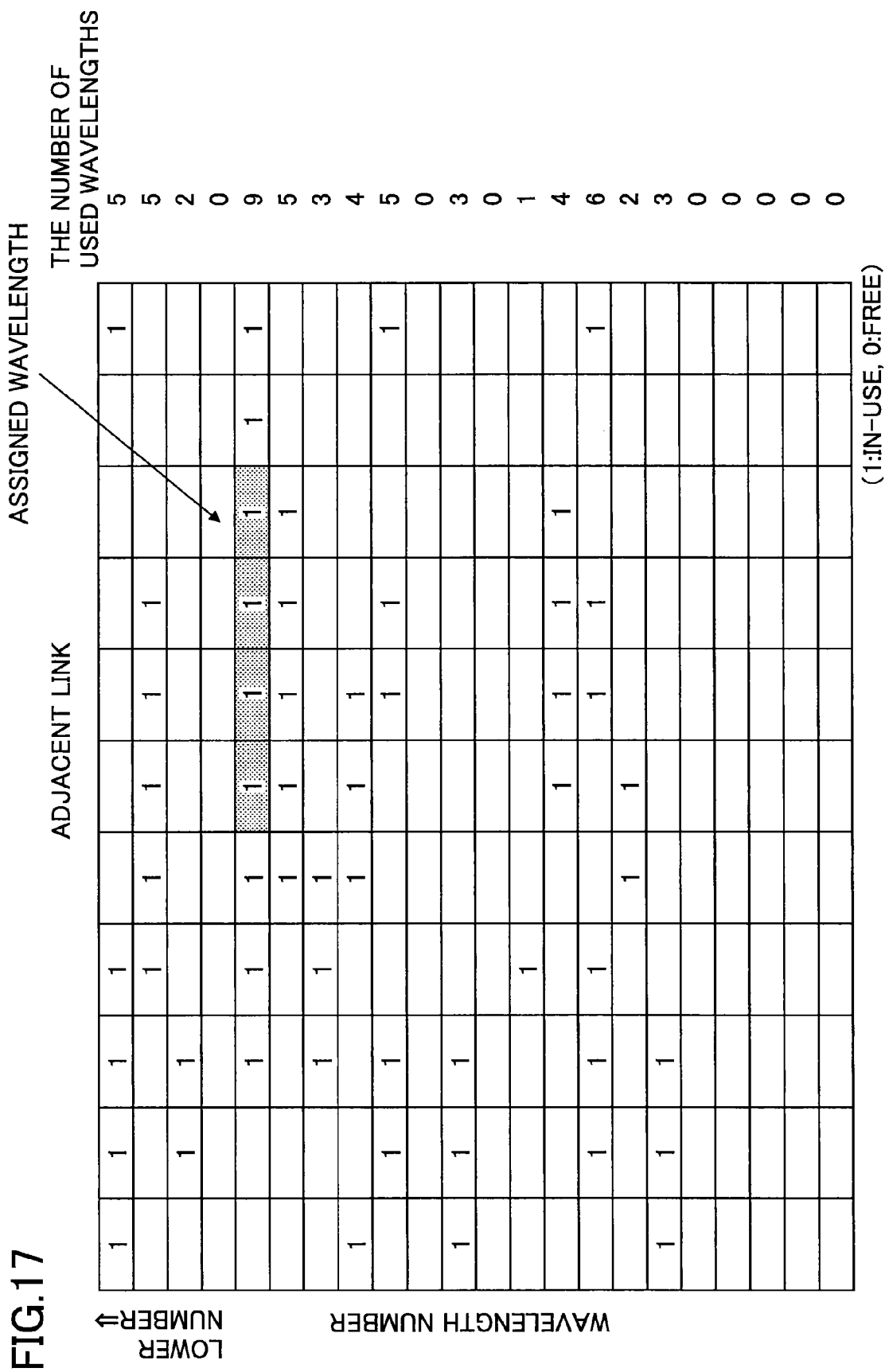
FIG. 17 is a wavelength assignment example according to an embodiment of the present invention.

As mentioned above, in the embodiment of the present invention, correlation is obtained for use states between a link forming the determined route and other link connected to an optical node to which the link is connected for every addable wavelength candidate, the total sum of correlations is calculated for every link forming the route, so as to determine an addable wavelength candidate by which the total sum becomes the largest to be an adding wavelength. As a result, as shown in FIG. 17, occurrence of the fragmented sections of assigned wavelength can be minimized so that it becomes possible to increase use efficiency of wavelength resources.

Seventh Embodiment

In the first to sixth embodiments of the present application, embodiments have been described on apparatuses that use a frequency and route determination method for mainly assigning fixed frequency bands. In the following, embodiments are described on apparatuses that use a frequency/route determination method for mainly assigning variable frequency bands.

The first to sixth embodiments uses the wavelength assignment step of obtaining a correlation amount of use states of each wavelength that is a fixed frequency, and adding a wavelength by which use states are most consecutive between adjacent links. On the other hand, in the following embodiments, correlation of use states of frequency between adjacent link is treated as a free common frequency state. Also, as to the correlation amount, an evaluation value given to the free frequency state in consideration of consecutiveness of the free frequency is used as the correlation amount.

Figure 18:
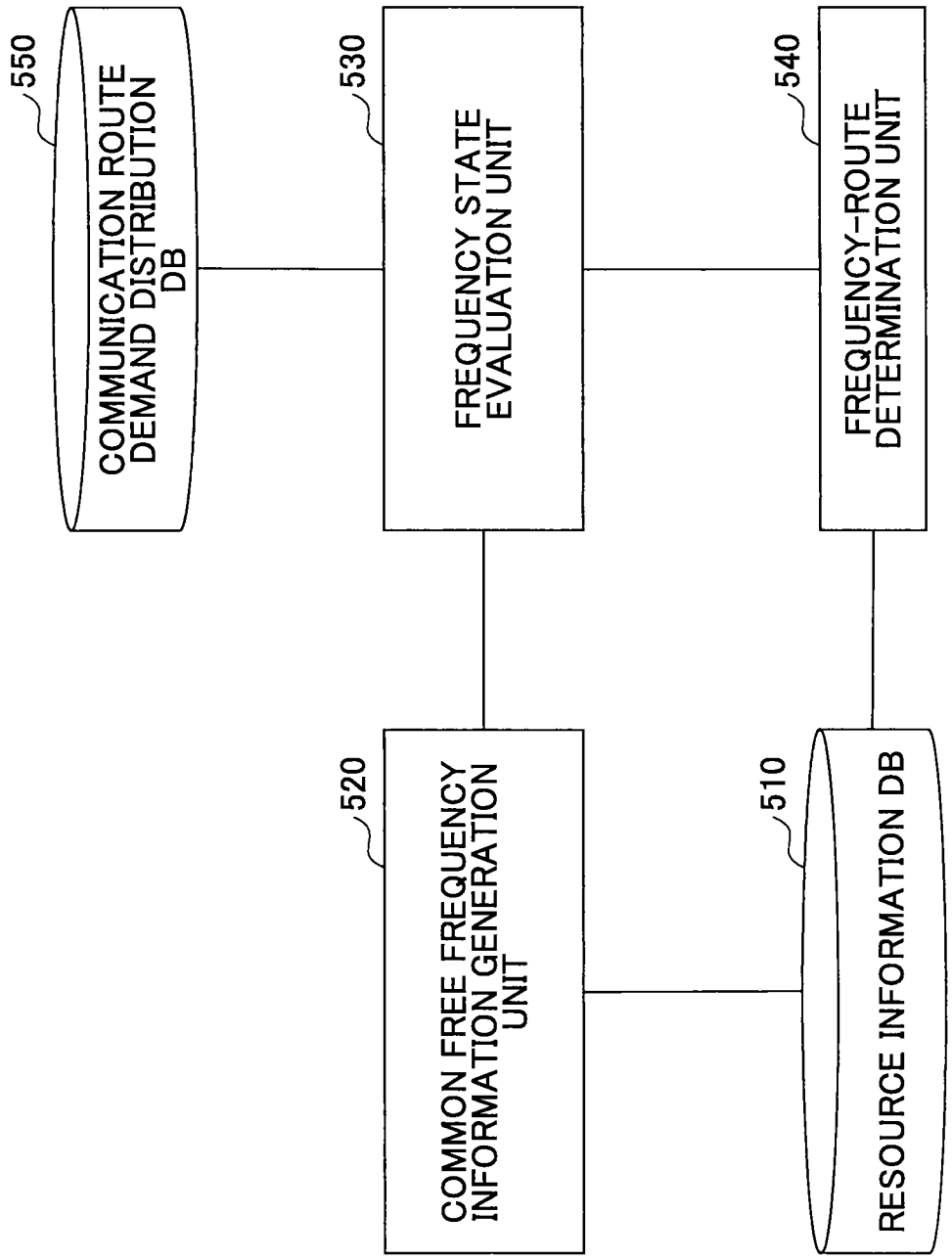
FIG. 18 is a block diagram of a frequency/route determination apparatus in a seventh embodiment of the present invention.

FIG. 18 is a block diagram of the frequency/route determination apparatus in the seventh embodiment of the present invention.

The frequency/route determination apparatus shown in the figure determines candidate route and frequency for a given path demand.

The frequency/route determination apparatus shown in FIG. 18 includes a resource information DB 510, a common free frequency information generation unit 520, a frequency state evaluation unit 530, a frequency/route determination unit 540, and a communication route demand distribution DB 550.

Each of the structural elements includes the following function.

Resource information DB 510: The resource information DB 510 is a DB for storing topology information of a network and resource information that includes free frequency information of fibers in the network. The topology information is information on connectivity of nodes in the communication network, and on fibers existing between nodes.

Common free frequency information generation unit 520: The common free frequency information generation unit 520 includes a function for obtaining resource information of a plurality of fibers that are calculation targets from the resource information DB 510, and generates free frequency information common to the obtained fibers.

Frequency status evaluation unit 530: The frequency status evaluation unit 530 includes an evaluation function for the free frequency information common to fibers generated by the common free frequency generation unit 520, and provides an evaluation value based on a designated evaluation method in consideration of consecutiveness of free frequency on free resource information, and in consideration of distribution (obtained from the communication route demand distribution DB 550) of assumed communication routes for the assumed communication route setting request.

Frequency/route determination unit 540:

The frequency/route determination unit 540 calculates a candidate route between a start point and an end point of a communication route for setting, and calculates a frequency that becomes an assignment candidate. The frequency/route determination unit 540 calculates a metric based on the evaluation value given by the frequency state evaluation unit 530, the metric being a value of a criterion for calculating a determined candidate from a plurality of candidates of combinations of candidate routes and assigned frequency. The frequency/route determination unit 540 calculates an optimum route and assigning frequency based on the calculated metric. The optimum route and assigning frequency means a route and assigning frequency by which the metric is the largest or the smallest. Policy information is set beforehand in the frequency/route determination unit for determining whether to select a route of the largest metric or to select a route of the smallest metric. For example, in a case where a frequency state evaluation unit 530 is used in which resource amount such as necessary equipment is in proportion to the metric, a candidate of the smallest metric is selected. In a case where a frequency state evaluation unit 530 is used in which free resource amount or flexibility of route/frequency selection is in proportion to the metric, a candidate of the largest metric is selected.

Communication route distribution DB 550: The communication route distribution DB 550 stores information on band distribution of arriving communication route demands or an estimated value of the band demand.

Figure 19:
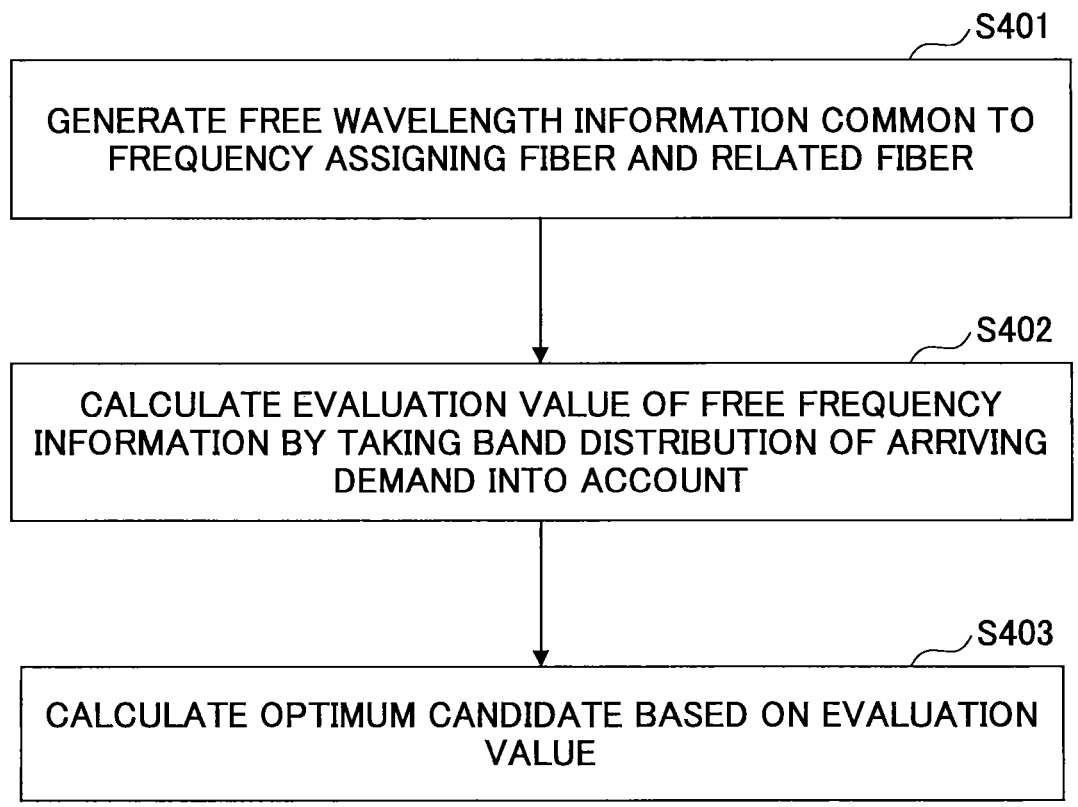
FIG. 19 is a flowchart of an outline of operation in the seventh embodiment of the present invention.

In the present embodiment, the frequency/route determination unit 540 calculates a plurality of route/frequency candidates from the start point node to the end point node. Then, for the obtained candidates, an evaluation value is given for frequency states of fibers by the following method, and an optimum route/frequency is selected based on the evaluation value. An outline of the method of the present embodiment is shown in FIG. 19.

Step 401) Generating free frequency information common to frequency assigning fibers and related fibers:

The common free frequency information generation unit 520 generates logical information on free frequency information common to fibers, between each fiber on a passing route and adjacent fibers directly reachable from the fiber passing through the candidate route or a fiber group including these adjacent fibers and fibers adjacent to these fibers.

Step 402) calculating evaluation value of free frequency information in consideration of band distribution of arriving demand:

The frequency state evaluation unit 530 provides an evaluation value for the logical information on the fiber common free frequency generated in step 401 by using an evaluation function considering consecutiveness of free frequency and an band distribution of arriving traffic.

Step 403) Calculating optimum candidate based on evaluation value:

The frequency/route determination unit 540 performs the above-mentioned evaluation for every route candidate/assigning frequency candidate, and selects a route/frequency of the best evaluation value as a candidate. The best evaluation value means that the evaluation value is the largest or the smallest.

The method of the present embodiment can be also applied to a band-fixed optical network that is considered to be a special case of the band variable network.

By the way, the communication route represents an optical path and the like that is established by using a band of an optical fiber using OFDM and WDM and the like.

In the following, an example of a procedure for determining frequency/route is shown.

Topology information (connection state between nodes and fibers) and free spectrum information of fibers are generated and stored in the resource information DB 510. The DB is updated each time when accommodation state of paths changes.

The free spectrum information of the fibers is managed by fine slots (or grids), and a use state is represented as a logical value for each slot. In this example, in-use is represented as true(1) and unused is represented as false(0).

As input information for calculation, topology information, fiber free frequency information, start node and end node of the communication route, and frequency bandwidth are input from the resource information DB 510.

The following procedure is executed for determining candidate route/frequency candidate of a requested frequency width w from a start point node s to an end point node d in the input topology.

Step 501) The common free frequency information generation unit 520 calculates every candidate route from the start point node s to the end point node d, and the set of the route group is set to be K. The route can be calculated by applying, a plurality of times, the Dijkstra algorithm, the BFS method, the k-shortest path method and the like that are generally used.

Step 502) The common free frequency information generation unit 520 checks passing fibers for a candidate route k in the route group K (if the path has m hops, there are m passing fibers).

Step 503) The common free frequency information generation unit 520 extracts, for H (composing elements h=1, . . . , h=m) that are passing fibers on the route k, directly-reachable adjacent fiber group $G_l$ from the topology information of the resource DB 510. And, the common free frequency information generation unit 520 obtains, for each of $G_l$ composing elements $g_l(gl=1, \ldots, L)$, logical OR on the logical information of the frequency use state (state in which the candidate path is not accommodated) between h and g. A logical bit sequence as a result of obtaining the logical OR is represented as $p_{hg}$. This is the common free frequency information. Also, a set of logical bit sequences obtained by performing the above-mentioned calculation for every passing fiber on the route k is represented as $P_k$. When performing the above-mentioned calculation for every passing fiber on the route k, as to a fiber once calculated as an adjacent fiber of a fiber in the calculation process for the route k, it is avoided to add such an adjacent fiver as an adjacent fiber redundantly.

Step 504) The frequency/route determination unit 540 calculates every frequency assignment pattern q (q has a width of w) that satisfies the requested frequency width w and that becomes an assignment candidate for the route k that is the calculation target. The calculated value is represented as $Q_k$.

Step 505) Assuming that one pattern of the frequency band $Q_k$ is assigned to the route k, in the status after assignment, the frequency/route determination unit 540 obtains logical OR between the passing fiber h the route k and adjacent fiber g that is directly reachable from h in the same way as step 503, and the logical bit sequence in which the logical OR is obtained is set to be $p'_{hqk}$. Also, a set of logical bit sequences obtained by performing the calculation on every passing fiber on k is represented as $P'_{qk}$.

Step 506) The frequency state evaluation unit 530 provides evaluation values for the $P'_{qk}$ and P obtained in step 503 by an evaluation function, compares them, and sets a decrease of the evaluation value in the case of route k and frequency q to be $\Delta_{qk}$.

Step 507) Steps from step 504 to step 506 are performed for every frequency assignment candidate q in $Q_k$ of the route k.

Step 508) Steps from step 502 to step 507 are performed for every route pattern k belonging to all routes K.

Step 509) The frequency/route determination unit 540 determines a combination of a route k and a frequency q by which the decrease $\Delta_{qk}$ of the evaluation value is the smallest to be the optimum route/frequency from s to d.

Figure 20:
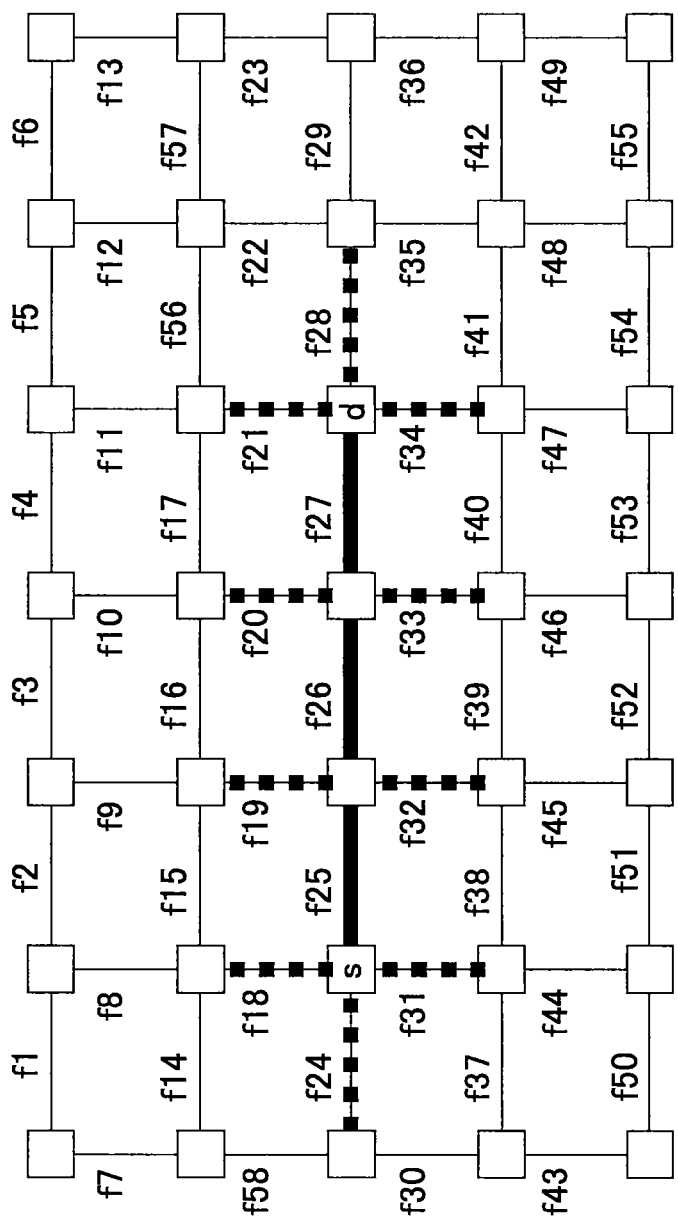
FIG. 20 shows an example of a part of calculation processing in the seventh embodiment of the present invention.

FIG. 20 shows an example of fiber pairs (composing element of H and composing element of G are paired) for calculating H, G and P considered in step 502. In this example, a route of 2 hops is incorporated for the start node s to the end node d. In this case, H={f25, f26, f27}, and G is formed by fibers that are directly reachable from the composing elements of H, and represented as G={f18, f19, f20, f21, f24, f28, f31, f32, f33, f34}. Also, in this case, combinations for generating the logical bit sequence p that is a composing element of P are shown as a table shown in FIG. 21, for example. (Although overlapping is not allowed after once selected from G in this example, overlapping may be allowed)

The fiber of the calculation target is G that is directly reachable from H in step 503. By adding a fiber group G' that is directly reachable from G, common free frequency information among three fibers of H, G, G' can be obtained. Similarly, by considering further adjacent fibers, the information can be made for equal to or more than four fibers. As mentioned above, by enlarging the range for obtaining the common free frequency information, it becomes possible to evaluate the frequency resources more effectively, so that frequency resources can be utilized more efficiently.

In the evaluation of the common free frequency information in the procedure, for each logical bit p or p'$_{hqk}$ that is each element of the logical bit set P or P'$_{qk}$ that is an evaluation target, an evaluation value for each element is provided by an evaluation function (after-mentioned), and the evaluation values are added, so that the added value is an evaluation value for the set.

As mentioned before, the common free frequency information generation unit 520 generates the bit sequence that is each element, as the common free frequency information, by calculating logical OR between fibers for bit sequence (the size is B) in which the use state of frequency slot of the fiber is represented by a logical value (in-use=1, unused=0). In the bit sequence representing the common free frequency information, all of free frequency regions (that exist one or more in a fiber band in general) in which one or more bits are consecutively free (unused) are extracted, and the number of slots which are consecutively free is counted for each free frequency region. The number of consecutive free slots is represented as n. Here, as to the band request width of the arriving demand, it is assumed that there are requests for various frequency bandwidths. (Requested frequency bands varies according to a band of the communication route to be established and the like) Assumed I patterns of frequency bandwidths are represented as $w_i$ (i=1, ..., I). In the following description, an example of $w_i$=i is described (another example of $w_i$ is shown later), and relative distribution of each demand arrival is represented as $r_i$ (i=1, ... I).

In this case, an evaluation value v(n) for an consecutive free space of the consecutive region n formed by the n consecutive slots is provided by calculation by the following evaluation function.

$$v(n) = \sum_{i=1}^{I} f(n, i) \cdot r_i$$

$$f(n, i) = \begin{cases} 0 & \text{if } w_i > n \\ n - w_i + 1 & \text{if } w_i \le n \end{cases}$$

In the calculation, evaluation is performed using $n-w_i+1$ for each assumed bandwidth, and the evaluation value is added by adding weight using $r_i$ for assumed every bandwidth type. Also, case analysis by f(n, i) excludes addition of an evaluation value for communication route demands that require a frequency band grater than the consecutive region n, so that evaluation suitable for the communication route demand can be performed.

The evaluation vale for a single bit sequence is obtained by adding the evaluation value obtained by the evaluation function for every consecutive free frequency band in the calculation target bit sequence.

For the sake of explanation, an example is shown for evaluating the common free frequency for two fibers.

It is assumed that fiber 1 and fiber 2 each having a capacity of 32 slots have the following spectrums respectively.
Fiber 1: 11111000000101000101110000000000
Fiber 2: 10101111000010111010101000000001

As to band distribution of demands, is assumed that demands of bandwidths of 1 slot ($w_1$), 2 slots ($w_2$), 3 slots ($w_3$) and 4 slots ($w_4$) occur at 2(r1):1(r2):1(r3):1(r4) respectively.

In this example, index i of $w_i$ is the same as the value of $w_i$. But, i and $w_i$ may not be the same in general. For example, setting can be made as $w_1$=3, $w_2$=2, $w_3$=6, which corresponds to the case where $w_i$=1 does not hold true.

The logical OR (bit OR) of bit sequences of the fiber 1 and the fiber 2 becomes 11111111000111111111111000000001.

In this case, since there are two consecutive free regions which are the three consecutive free slots and eight consecutive free slots, evaluation is performed for the two by the evaluation function.

<Calculation in a Case of Three Consecutive Region (n=3)>

1) For bandwidth 1 slot (i=1)
Since the bandwidth is equal to or less than the consecutive region n, f(3,1)·r1=(3−1+1)·2=6 is obtained.

2) For bandwidth 2 slot (i=2)
Since the bandwidth is equal to or less than the consecutive region n, f(3,2)·$r_2$=(3−2+1)·1=2 is obtained.

3) For bandwidth 3 slot (i=3)
Since the bandwidth is equal to or less than the consecutive region n, f(3,3)·$r_3$=(3−3+1)·1=1 is obtained.

4) For bandwidth 4 slot (i=4)
Since the bandwidth is greater than the consecutive region n, f(3,4)·$r_4$=0·1=0 is obtained.

The values of 1)-4) are added, so that the evaluation value for the three consecutive region becomes 9.

<Calculation in a Case of Eight Consecutive Region (n=8)>

1) For bandwidth 1 slot (i=1)
Since the bandwidth is equal to or less than the consecutive region n, f(3,1)·r1=(8−1+1)·2=16 is obtained.

2) For bandwidth 2 slot (i=2)
Since the bandwidth is equal to or less than the consecutive region n, f(3,2)·$r_2$=(8−2+1)·1=7 is obtained.

3) For bandwidth 3 slot (i=3)
Since the bandwidth is equal to or less than the consecutive region n, f(3,3)·$r_3$=(8−3+1)·1=6 is obtained.

4) For bandwidth 4 slot (i=4)
Since the bandwidth is equal to or less than the consecutive region n, f(3,4)·$r_4$=(8−4+1)·1=5 is obtained.

The values of 1)-4) are added, so that the evaluation value for the eight consecutive region becomes 33.

The evaluation value (9) of the three consecutive region and the evaluation value (33) of the eight consecutive region are added, so that the evaluation value of the common free frequency region information of the fiber 1 and fiber 2 is calculated as 42.

As mentioned above, in the present embodiment, a frequency assignment apparatus (frequency and route determination apparatus) is provided for selecting a route and a frequency connecting between a start point and an end point of an optical signal in a photonic network including an optical node that includes an optical switch for switching the optical signal without electrically terminating the optical signal. The frequency assignment apparatus includes: a route/frequency calculation result storage unit configured to store route and frequency calculation results; a common free frequency information generation unit configured to extract fibers connected to each other, and perform logical calculation for logical information representing free frequency states of each of the extracted fibers so as to generate logical information on free frequency states common to fibers; a free frequency state evaluation unit configured to provide an evaluation value for the free frequency states based on the generated free frequency information common to fibers, in consideration of consecutiveness of free frequencies in the free frequency states common to fibers; and a frequency and route determination unit configured to determine a frequency and passing fibers to be set as a communication route using the evaluation value calculated in the free frequency state evaluation unit as a criterion, and store the frequency and passing fibers in the route/frequency calculation result storage unit.

The frequency state evaluation unit obtains band distribution information of communication route demand from the communication route demand distribution DB so as to determine the evaluation value in consideration of the band distribution of the assumed communication route band.

Eighth Embodiment

As to the evaluation function used in the seventh embodiment, calculations described bellow can be also applied.

It is assumed that M is the largest bandwidth in the maximum arrival distribution obtained from the communication route demand distribution DB 550. The evaluation value v(n) for the consecutive free region of the consecutive region n formed by n consecutive slots is defined as following in general.

$$v(n) = \begin{cases} a \cdot \alpha^n + b \cdot n^2 + c \cdot n + d & \text{if } M + \beta \geq n \\ a' \cdot \alpha^n + b' \cdot n^2 + c' \cdot n + d' & \text{if } n > M + \beta \end{cases}$$

In the formula, a, b, c, d, a', b', c', d', $\alpha$, $\alpha'$, $\beta$ are arbitrary constants, and an operator can set them beforehand in the evaluation function unit.

Also, a, b, c, d, a', b', c', d', $\alpha$, $\alpha'$, and $\beta$ can be optimized for an assumed topology, by applying the above-mentioned evaluation function to the evaluation function of the seventh embodiment, repeating calculation for the input topology by changing the evaluation function, and selecting an evaluation function that provides a preferable result (determined by a value such as blocking rate, the number of communication routes that can be accommodated, necessary equipment amount, frequency use efficiency and the like) for the operator. The preferable result for the operator is a result by which necessary equipment amount becomes the smallest, for example.

Figure 22:
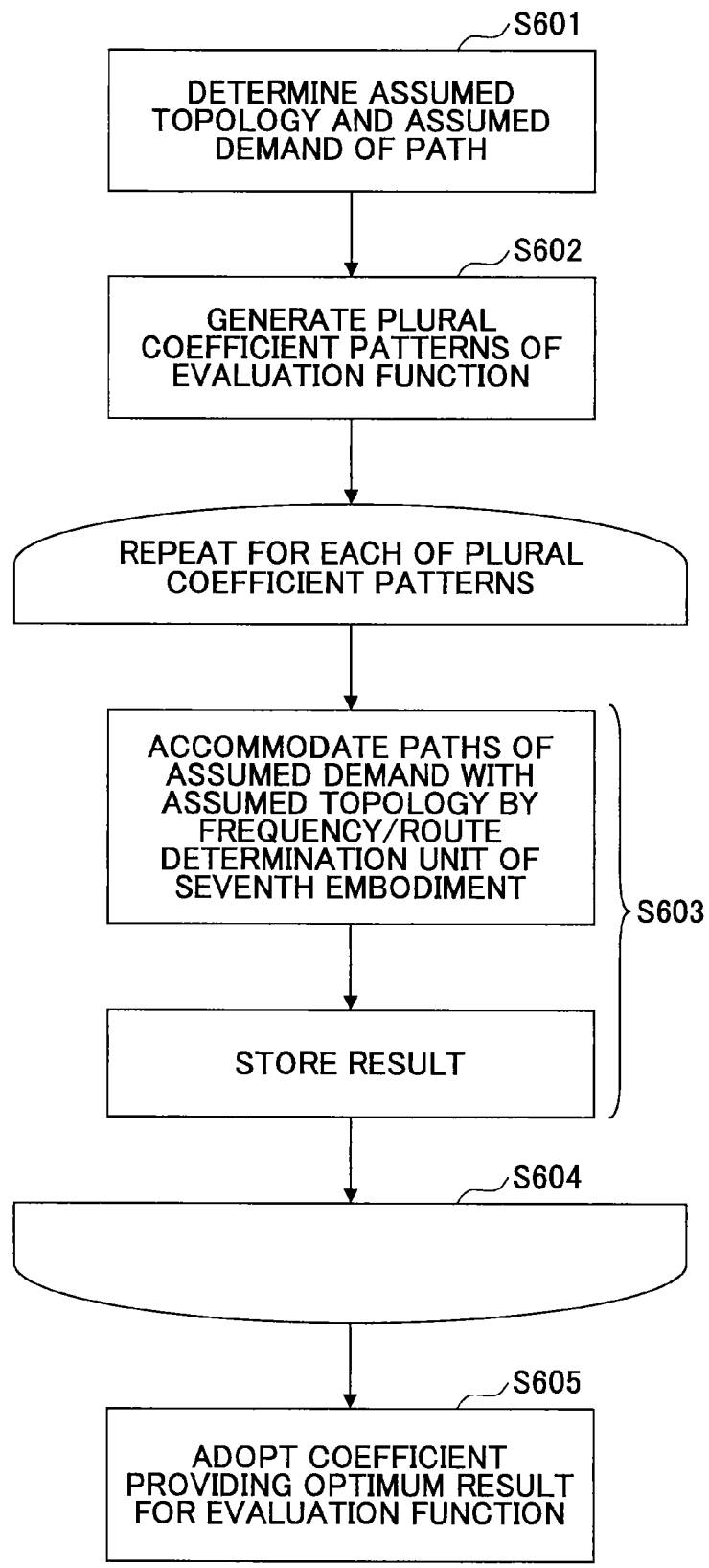
FIG. 22 is a flowchart of an evaluation function determination method in an eighth embodiment of the present invention.

This procedure is shown in FIG. 22. Here, the blocking rate indicates that a communication route setting becomes unavailable due to lack of equipment amount, restriction of consecutive wavelengths and the like. The number of communication routes that can be accommodated represents the number of communication routes that can be accommodated in a predetermined equipment amount. The necessary equipment amount means an amount of necessary equipment such as the number of nodes, the number of routes of the node, the number of ports, the number of fibers and the like. The frequency use efficiency means a frequency band amount in the fiber necessary for accommodating predetermined communication routes. The optimum value is determined based a policy (maximize/minimize, or the like) set by an operator.

Step 601) The assumed topology and band distribution of assumed communication route demand are determined.

Step 602) Next, a coefficient pattern for each of a, b, c, d, a', b', c', d', $\alpha$, $\alpha'$, $\beta$ is generated.

Step 603) One of the generated coefficient patterns is selected, the evaluation function is defined by the coefficients, a communication route is accommodated using the assumed topology and assumed demand, so that the result is stored.

Step 604) Step 603 is repeated by changing the pattern generated in step 602.

Step 605) Results that are determined by repeating steps 603 and 604 are compared, so that the evaluation function is defined by coefficients that provide the optimum result.

In step 605, as evaluation criteria for providing the optimal result, the blocking rate, the number of communication routes that can be accommodated, the necessary equipment amount, the frequency use efficiency, and combination of these can be used. As mentioned before, the blocking rate indicates that a communication route setting becomes unavailable due to lack of equipment amount, restriction of consecutive wavelengths and the like. The number of communication routes that can be accommodated represents the number of communication routes that can be accommodated in a predetermined equipment amount. The necessary equipment amount means an amount of necessary equipment such as the number of nodes, the number of routes of the node, the number of ports, the number of fibers and the like. The frequency use efficiency means a frequency band amount in the fiber necessary for accommodating predetermined communication routes. The optimum value is determined based a policy (maximize/minimize, or the like) set by an operator.

Also, in step 604, when selecting a next coefficient pattern, it is possible to optimize the coefficients more efficiently by selecting a coefficient pattern (a, b, c, d, a', b', c', d', $\alpha$, $\alpha'$, $\beta$) by a procedure by which the optimization efficiency is improved in consideration of the result obtained in step 603. Here, the optimization efficiency is the number of times of repetition and required time for obtaining the optimum evaluation function.

As to a consecutive free slot region greater than the expected maximum band of the communication route, since there is no case where the whole consecutive slot region is used in one communication route, it is not necessary to consider an accommodation pattern equal to or greater than the maximum band. Therefore, the order of function on the consecutive slot number n for the evaluation function (v1(n)) for a consecutive free slot region greater than the maximum band is set to be smaller than that for the evaluation function (v2(n)) for a consecutive free slot region smaller than the maximum band, so that an optimum evaluation function can be efficiently determined. For example, when v2(n) has an order of quadratic function, it is good to define v1(n) using linear function which has a lower order than the quadratic function. Here, the order represents an increase speed of an absolute value of the function for n.

The value of the evaluation function may become a very large number according to circumstances. Thus, the present embodiment may be carried out by using a logarithm of the evaluation value as necessary.

As mentioned above, in the present embodiment, the frequency state evaluation unit assumes a topology and a communication route band distribution of a communication network to which the communication route is to be set, and performs the frequency state evaluation step one or more times while changing the evaluation function for calculating the evaluation value so as to adopt an evaluation function by which a better result can be obtained.

Ninth Embodiment

Figure 23:
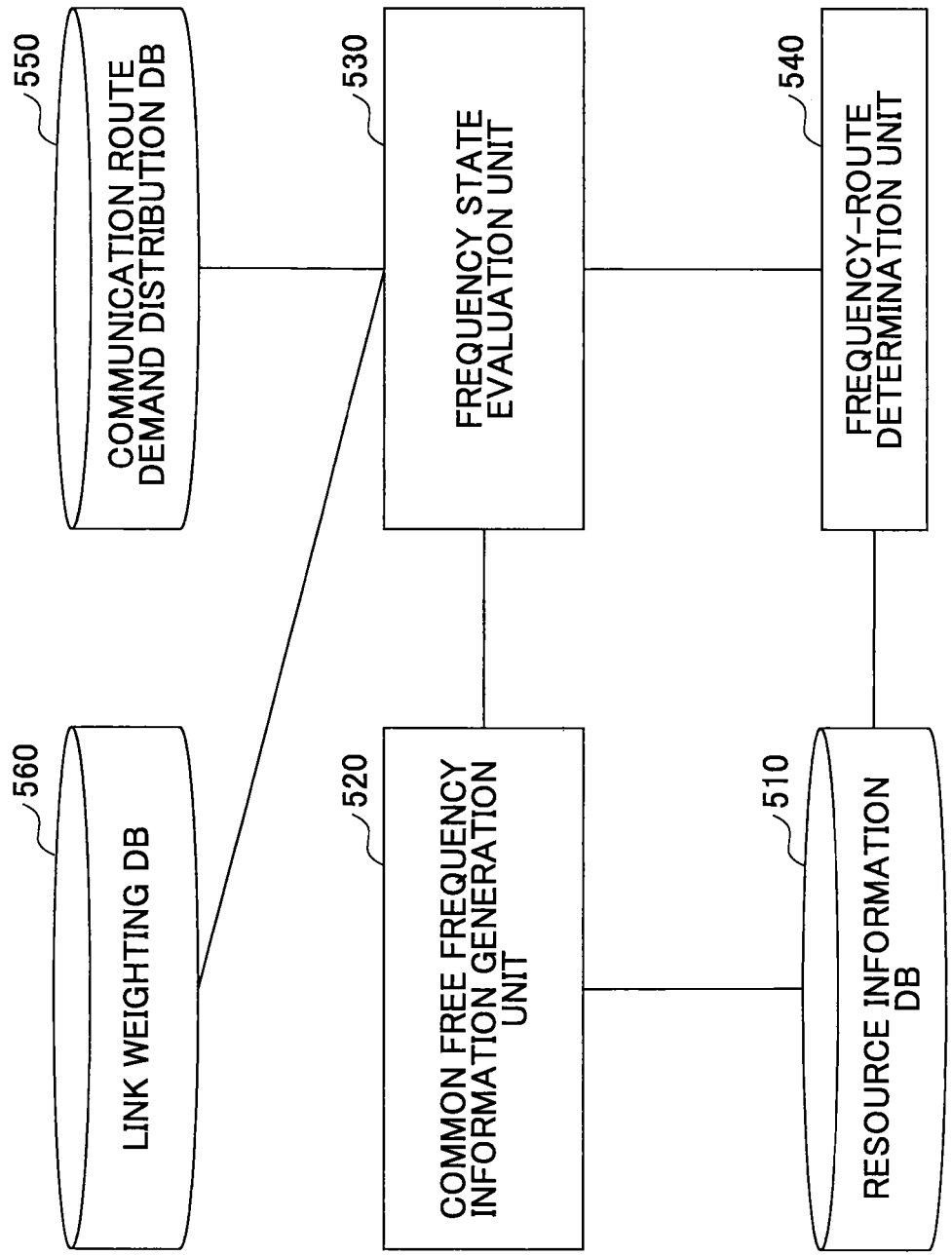
FIG. 23 is a block diagram of a frequency/route determination apparatus including a link weighting DB for each fiber in a ninth embodiment of the present invention.

FIG. 23 shows a configuration of a frequency/route determination apparatus in a case where the apparatus includes a weighting DB for each fiber in the ninth embodiment of the present invention.

In the seventh and eighth embodiments, it is possible to provide a link weighting DB 560, to the configuration of FIG. 18, that is a database for storing weighting values for each fiber. In this case, when evaluating the common fee frequency information, evaluation can be performed by adding the weight provided for each fiber that is the evaluation target by referring to the link weighting DB 560. Accordingly, it becomes possible to utilize resources suitable for actual operation by storing resources of particular fibers in view of the circumstances on maintenance and management and the like. In this case, the link weighting DB stores weighting values of each link for each fiber.

In this case, the frequency state evaluation unit 530 multiplies the evaluation function for evaluating v(n) described in the seventh embodiment by weighting values of both fibers consisting of the pair, so as to carry out the seventh and eighth embodiments as follows.

$$v(n) = \sum_{i=1}^{I} f(n, i) r_i x_c x_a$$

In the equation, $x_c$ indicates a weight of a fiber on the candidate route, and $x_a$ indicates a weight of an adjacent fiber that forms a pair with the fiber on the candidate route.

Also, it is possible to store weight information $y_p$ for each fiber pair in the link weighting DB 560 so as to add weight for each pair. An evaluation function when adding weight for each pair is as follows.

$$v(n) = \sum_{i=1}^{I} f(n, i) r_i y_p$$

Also, it is possible to optimize the weight information by searching optimum weight coefficient by repeating calculation.

Figure 24:
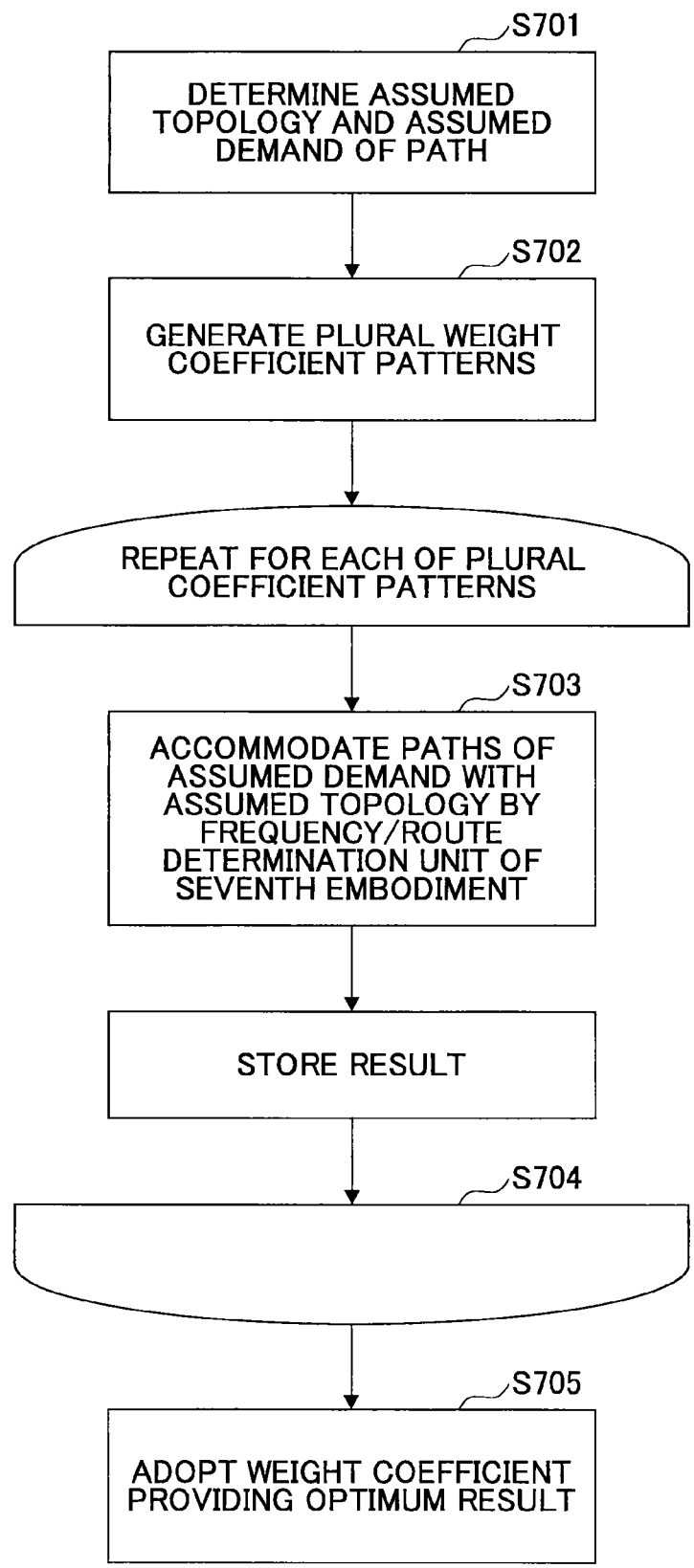
FIG. 24 is a flowchart of a weight coefficient determination method in the ninth embodiment of the present invention.

FIG. 24 shows the optimization flow.

Step 701) The assumed topology, and the band distribution of the assumed communication route demand are determined.

Step 702) Next, a plurality of patterns of weight coefficients are generated.

Step 703) The frequency/route determination unit 540 of the seventh embodiment accommodates a path of the assumed demand in the assumed topology, and stores the result.

Step 704) Step 703 is repeated the number of times of the patterns by changing the pattern generated in step 702.

Step 705) Results determined by repetition of steps 703 and 704 are compared so that an evaluation function is defined using a coefficient that provides the optimum result.

Also, it is possible to add both of the weight for each fiber and the weight for each fiber pair so as to be able to designate the weight in more detail.

As mentioned above, in the present embodiment, the frequency state evaluation unit refers to a weighting DB that stores weighting information for each fiber or for each fiber pair so as to provide the evaluation value in consideration of weighting values for each fiber or for each fiber pair that is an evaluation target.

In each of the above-mentioned embodiments, operation of each of the functional units of the network management apparatus such as the routing unit and the wavelength assignment unit can be constructed as a program, and the program can be installed and executed in a computer that is used as the network management apparatus, and also can be distributed via a network. The same thing can be applied for the frequency/route determination apparatus.

Also, it is possible to store the constructed program in a hard disk, and in a portable recording medium such as a flexible disk and CD-ROM and the like, so as to install the program in a computer or to distribute the program.

Also, two or more embodiments may be combined and used as necessary.

Effect of Embodiments

As mentioned above, according to the embodiments of the present invention; in a case where there is optical path demands for various routes, when assigning route and wavelength (frequency) for satisfying the demands, newly assigned wavelength or frequency is determined by considering use state of wavelength (frequency) of each link. Thus, occurrence of fragmentation in the transparent type optical path network is effectively suppressed, so that use efficiency of wavelength (frequency resources can be optimized. Therefore, according to the embodiments of the present invention, as shown in FIG. 17, for example, it becomes possible to place a wavelength so as to prevent fragmentation of wavelength. Further, even when the width of wavelength is different for each path, similar effect can be obtained.

The present invention is not limited to the specifically disclosed embodiments, and variations and modifications may be made without departing from the scope of the claims.

The present international application claims priority based on Japanese patent application No. 2010-238862 filed on Oct. 25, 2010, Japanese patent application No. 2011-64759 filed on Mar. 23, 2011, and Japanese patent application No. 2011-156119 filed on Jul. 14, 2011, and the entire contents of the applications No. 2010-238862, No. 2011-64759 and No. 2011-156119 are incorporated herein by reference.

DESCRIPTION OF REFERENCE SIGNS

10 routing unit
20 wavelength assignment unit
21 wavelength assignment calculation unit
22 determination unit
23 mapping unit
24 wavelength use state management unit
25 wavelength use state information storage unit
100, 200, 300 network management apparatus
400 photonic network
510 resource information DB 510
520 common free frequency information generation unit
530 frequency state evaluation unit
540 frequency/route determination unit
550 communication route demand distribution DB
560 link weighting DB

The invention claimed is:

1. A frequency assignment method for selecting a frequency width used on a route connecting between a start point and an end point when the start point and the end point of an optical signal are supplied in a photonic network including an optical node that includes an optical switch for switching the optical signal without electrically terminating the optical signal, in an apparatus comprising: a calculation result storage unit configured to store a calculation result of a route and a frequency; a router unit configured to perform route calculation and store the route calculation result in the calculation result storage unit; and an assignment unit configured to assign a frequency width of the network, the method comprising:

in the assignment unit, referring to the route calculation result of the calculation result storage unit, obtaining a correlation amount of use state of wavelength or frequency between adjacent links, determining a fixed frequency width or variable frequency width to be set for a communication route based on the correlation amount, and assigning the fixed frequency width or the variable frequency width on the route.

2. The frequency assignment method as claimed in claim 1, comprising:

a wavelength assigning step of assigning an optical wavelength as the fixed frequency width, including:

referring to the route calculation result of the calculation result storage unit so as to obtain, for each of optical node forming the route of the route calculation result, a correlation amount of use state of wavelength between a link to be added and an adjacent link adjacent via the optical node, and adding a wavelength in which use states are most consecutive between adjacent links.

3. The frequency assignment method as claimed in claim 2, the wavelength assignment step comprising:

when there are two or more wavelengths of the same correlation amount, extending a link that is a target for correlation to a link adjacent via an optical node, that is one-hop ahead, connected by a link adjacent via the optical node forming the route.

4. The frequency assignment method as claimed in claim 2, the wavelength assignment step comprising:

when there are two or more wavelengths of the same correlation amount, selecting an optical wavelength of a lower number in optical wavelengths that are arbitrarily numbered.

5. The frequency assignment method as claimed in claim 2, the wavelength assignment step comprising:

when there are two or more wavelengths of the same correlation amount, selecting an optical wavelength of a lower number in optical wavelengths that are numbered in order from a shortest optical wavelength or from a longest optical wavelength.

6. The frequency assignment method as claimed in claim 2, the wavelength assignment step comprising:

generating, on a storage unit, an array indicating use states of wavelengths for each of links forming the route;

generating, on the storage unit, a similar array also for an adjacent link that is adjacent to the link via the optical node forming the route;

calculating a correlation amount between the link and the adjacent link for each of optical nodes forming the route; and adding a wavelength by which the total sum of the obtained correlation amounts becomes the largest.

7. The frequency assignment method as claimed in claim 2, the wavelength assignment step comprising:

generating, on a storage unit, an array indicating use states of wavelengths for each of links forming the route;

generating, on a storage unit, a similar array also for an adjacent link that is adjacent to the link via the optical node forming the route;

calculating a correlation amount by exclusive OR between the link and the adjacent link for each of optical nodes forming the route; and adding a wavelength by which the total sum of the obtained correlation amounts becomes the smallest.

8. The frequency assignment method as claimed in claim 2, the wavelength assigning step comprising:

generating, on a storage unit, an array indicating use states of wavelengths for each of links forming the route;

generating, on a storage unit, a similar array also for an adjacent link that is adjacent to the link via the optical node forming the route;

extracting data of adding wavelength portion between the link and the adjacent link, calculating a correlation amount by exclusive OR for the adding wavelength portion for each of optical nodes forming the route; and adding a wavelength by which the total sum of the obtained correlation amounts becomes the smallest.

9. The frequency assignment method as claimed in claim 2, the wavelength assignment step comprising:

generating, on a storage unit, an array indicating use states of wavelengths for each of links forming the route;

generating, on a storage unit, a similar array also for an adjacent link that is adjacent to the link via the optical node forming the route;

extracting data of adding wavelength portion between the link and the adjacent link, calculating a correlation amount by logical OR for the adding wavelength portion for each of optical nodes forming the route; and adding a wavelength by which the total sum of the obtained correlation amounts becomes the largest.

10. The frequency assignment method as claimed in claim 7, the wavelength assignment step comprising:

when there are two or more wavelengths by which the total sum of the correlation amounts becomes the smallest, selecting a wavelength of a lower number from among wavelengths that are arbitrarily numbered.

11. The frequency assignment method as claimed in claim 6, wherein in the wavelength assignment step, as the array indicating use states of wavelengths, a positive real number is used when the wavelength is used, and zero is used when the wavelength is unused.

12. The frequency assignment method as claimed in claim 6, wherein, in the wavelength assignment step, when the correlation amount for the link and the adjacent link via the optical node is calculated, a product of elements of the same wavelength in the array is calculated, and the total sum of the products for every wavelength is used.

13. The frequency assignment method as claimed in claim 2, further comprising a request receiving step of receiving an electrical path establishment request;

the wavelength assignment step comprising a mapping step in which, when performing route search based on the electrical path establishment request, if an existing wavelength exists, a route having the existing wavelength is selected preferentially, and the electrical path is mapped;

wherein, in the mapping step, if the existing wavelength exists, an optical wavelength by which the correlation amount becomes the largest is selected from the existing wavelength.

14. The frequency assignment method as claimed in claim 2, further comprising a request receiving step of receiving an electrical path establishment request;

wherein, in the wavelength assignment step, when performing route search based on the electrical path establishment request, if no existing wavelength exists, an optical wavelength by which the correlation amount becomes the largest is newly established, and the electrical path is mapped.

15. The frequency assignment method as claimed in claim 1, wherein, in a wavelength assignment step,
a wavelength in which use states of wavelengths are most consecutive between adjacent links is added, based on a correlation amount of use states of wavelengths between a link to be added and an adjacent link adjacent via the optical node for each of optical nodes forming the route of the route calculation result.

16. The frequency assignment method as claimed in claim 1, comprising, when assigning a frequency as the variable frequency width,
a common free frequency information generation step in which the assignment unit extracts fibers connected to each other, and performs logical calculation for logical information representing free frequency states of each of the extracted fibers so as to generate logical information on free frequency information common to fibers;
a frequency state evaluation step in which the assignment unit provides an evaluation value for the free frequency states based on the free frequency information common to fibers generated in the common free frequency information generation step, in consideration of consecutiveness of free frequencies in the free frequency states common to fibers; and
a frequency assignment step in which the assignment unit determines a frequency and passing fibers to be set as a communication route using the evaluation value calculated in the frequency state evaluation step as a criterion, and stores the frequency and passing fibers in a route/frequency calculation result storage unit.

17. The frequency assignment method as claimed in claim 16, the frequency state evaluation step comprising:
obtaining band distribution information of communication route demand from a communication route demand distribution DB so as to determine the evaluation value in consideration of the demand band distribution of an assumed communication route band.

18. The frequency assignment method as claimed in claim 16, the frequency state evaluation step comprising:
assuming a topology and a communication route band distribution of a communication network to which the communication route is to be set, and performing the frequency state evaluation step one or more times while changing the evaluation function for calculating the evaluation value so as to adopt an evaluation function by which a better result can be obtained.

19. The frequency assignment method as claimed in claim 16, the frequency state evaluation step comprising:
referring to a weighting DB that stores weighting information for each fiber or for each fiber pair so as to provide the evaluation value in consideration of weighting values for each fiber or for each fiber pair that is an evaluation target.

20. A frequency assignment apparatus for selecting a route and a frequency connecting between a start point and an end point of an optical signal in a photonic network including an optical node that includes an optical switch for switching the optical signal without electrically terminating the optical signal, comprising:
a route/frequency calculation result storage unit configured to store route and frequency calculation results;
a common free frequency information generation unit configured to extract fibers connected to each other, and perform logical calculation for logical information representing free frequency states of each of the extracted fibers so as to generate logical information on free frequency states common to fibers;
a free frequency state evaluation unit configured to provide an evaluation value for the free frequency states based on the generated free frequency information common to fibers, in consideration of consecutiveness of free frequencies in the free frequency states common to fibers; and
a frequency and route determination unit configured to determine a frequency and passing fibers to be set as a communication route using the evaluation value calculated in the free frequency state evaluation unit as a criterion, and store the frequency and passing fibers in the route/frequency calculation result storage unit.

21. The frequency assignment apparatus as claimed in claim 20, further comprising:
a communication route demand distribution DB configured to store band distribution of assumed communication route demand;
the common free frequency information generation unit comprising:
a unit configured to obtain band distribution information of communication route demand from the communication route demand distribution DB so as to determine the evaluation value in consideration of the band distribution of the assumed communication route band.

22. The frequency assignment apparatus as claimed in claim 20, further comprising:
a weighting DB configured to store weighting information for each fiber or for each fiber pair,
the frequency state evaluation unit comprising:
a unit configured, when providing the evaluation value for the free frequency states common to fibers, to obtain weighting information for each fiber or for each fiber pair stored in the weighting DB so as to provide the evaluation value in consideration of weighting values for each fiber or for each fiber pair that is an evaluation target.

* * * * *